United States Patent
Haehnel et al.

(10) Patent No.: US 10,710,818 B2
(45) Date of Patent: *Jul. 14, 2020

(54) TRANSFER UNIT AND METHOD FOR TRANSFERRING BLISTER PACKS

(71) Applicant: Uhlmann Pac-Systeme GmbH & Co. KG, Laupheim (DE)

(72) Inventors: Bernd Haehnel, Stutensee (DE); Sebastian Binder, Schwendi (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,882

(22) Filed: Apr. 8, 2019

(65) Prior Publication Data

US 2019/0322469 A1    Oct. 24, 2019

(30) Foreign Application Priority Data

Apr. 23, 2018    (EP) .................................... 18168648

(51) Int. Cl.
  *B65G 47/91*    (2006.01)
  *B65B 35/18*    (2006.01)
  *B65B 35/38*    (2006.01)
  *B65B 35/50*    (2006.01)

(52) U.S. Cl.
  CPC ............ *B65G 47/918* (2013.01); *B65B 35/18* (2013.01); *B65B 35/38* (2013.01); *B65B 35/50* (2013.01)

(58) Field of Classification Search
  CPC ........ B65G 47/918; B65B 35/18; B65B 35/38
  See application file for complete search history.

(56) References Cited

U.S. PATENT DOCUMENTS

| | | | |
|---|---|---|---|
| 2007/0251804 A1 | 11/2007 | Hahnel et al. | |
| 2015/0056046 A1 | 2/2015 | Haehnel et al. | |
| 2019/0322399 A1* | 10/2019 | Haller | B65G 47/914 |
| 2019/0322400 A1* | 10/2019 | Haehnel | B65B 35/44 |
| 2019/0322469 A1* | 10/2019 | Haehnel | B65B 35/18 |
| 2019/0322470 A1* | 10/2019 | Haehnel | B65B 35/18 |
| 2019/0322471 A1* | 10/2019 | Haehnel | B65G 47/918 |

FOREIGN PATENT DOCUMENTS

| | | | |
|---|---|---|---|
| DE | 10 2004 043332 A1 | 3/2006 | |
| DE | 10 2006 047925 A1 | 4/2008 | |
| DE | 102006047925 A1 * | 4/2008 | ............ B65G 47/08 |
| EP | 2 840 030 A1 | 2/2015 | |
| WO | WO 2014/181307 A1 | 11/2014 | |

OTHER PUBLICATIONS

International Search Report for European Application No. 18168648.6, dated Aug. 10, 2018, 5 pgs.

* cited by examiner

*Primary Examiner* — Gerald McClain
(74) *Attorney, Agent, or Firm* — Dickinson Wright PLLC

(57) ABSTRACT

In the method for transferring blister packs from a first and a second pick position to a common place position, the blister packs in the first and second pick positions are arranged next to each other in a row and are each outwardly offset from the longitudinal center plane of the transfer unit. Then the two blister packs are picked successively by two suction arms and placed from above in the place position, which is in the area of the longitudinal center plane. After the placing step, the blister packs in the place positions have a rotation of 180° around their centers in comparison to their orientation in the pick positions; and in addition the blister packs acquire a lateral offset during the transfer.

28 Claims, 17 Drawing Sheets

TRANSFER UNIT AND METHOD FOR TRANSFERRING BLISTER PACKS

RELATED APPLICATIONS

This application claims priority to European Patent Application No. 18 168 648.6, filed on Apr. 23, 2018, entitled "Transfer Unit And Method For Transferring Blister Packs", the the contents of which are incorporated herein by reference in their entirety.

FIELD

The present disclosure relates to a transfer unit and a method for transferring blister packs.

BACKGROUND

Blister packs are frequently used in the pharmaceutical industry for the packaging of medications. A plurality of pockets, into which products such as sugar-coated pills or tablets are introduced, are first formed in a film web. After the pockets have been filled, the film web is sealed with a lidding foil and then sent to a stamping station, in which the individual blister packs are stamped out from the film web.

In another phase of the packaging process, the stamped-out blister packs are transferred to a conveying means by the use of a transfer device. The blister packs are placed in individual receptacles of the conveying means to form stacks. Then the stacks of blister packs arranged on the conveying means are sent to a packaging station, where the stacks of blister packs are introduced into appropriate packaging such as folding boxes. The time which the transfer device requires to transfer blister packs from the stamping station to the conveying means logically has an influence on the throughput of the overall packaging machine.

BRIEF SUMMARY

The present disclosure provides an improved transfer unit and a method for transferring blister packs, wherein the transfer of the blister packs proceeds with an especially high degree of efficiency, precision, and speed.

According to an aspect of the present disclosure, the transfer unit for transferring blister packs comprises a first suction arm, which can be moved between a first picking position, in which it can pick a first blister pack from a first pick position, and a first placing position, in which it can place the first blister pack in a place position; and a second suction arm, which can be moved between a second picking position, in which it can pick a second blister pack from a second pick position, and a second placing position, in which it can place the second blister pack in the same place position. The first and second suction arms are arranged on either side of a longitudinal center plane of the transfer unit, wherein each suction arm comprises a first segment and a second segment. The first segment of each suction arm is mounted so that it can rotate around an associated first axis, which is perpendicular to the longitudinal center plane; and the first segment of each suction arm comprises a section to which the second segment is attached so that it can rotate around a non-stationary second axis, which is substantially perpendicular to the first axis; wherein a suction device for drawing up and holding a blister pack is arranged on the second segment. The suction arms are configured and actuated in such a way that the movement of the suction arms from the first or second picking position to the first or second placing position and back is a combined movement, which consists at least of a first rotational movement of the first segment and of the second segment around the first axis and a second rotational movement of the second segment around the second axis. The suction arms are configured and actuated in such a way that the suction devices of the first and second suction arms draw up the blister packs in the first and second pick positions by acting on a flat surface of each blister pack, whereupon the blister packs are placed from above in the place position with the flat surface facing up; wherein the first and second pick positions are outwardly offset from the longitudinal center plane, and the place position is arranged in the area of the longitudinal center plane. The second axis of the first suction arm is arranged in such a way that, during the first rotational movement of the first segment of the first suction arm, the second axis of the first suction arm moves in a first plane, which intersects the first pick position or its lateral projection along a first straight line, which is laterally offset from the center of the first pick position. The second axis of the second suction arm is arranged in such a way that that, during the first rotational movement of the first segment of the second suction arm, the second axis of the second suction arm moves in a second plane, which intersects the second pick position or its lateral projection along a second straight line, which is laterally offset from the center of the second pick position.

This guarantees a reliable transfer of the blister packs, during which two files of blister packs are merged into one file in a simple manner and with high throughput.

The suction arms are preferably configured and actuated in such a way that the blister packs in the first and second pick positions are picked from above by the suction devices of the first and second suction arms and also placed from above in the place position. Because the blister packs are picked from above, the blister packs can lie flat in the pick positions. The placing of the blister packs in the place position from above guarantees the most flexible possible release time of the blister packs by the suction devices.

The second segment of the first or second suction arm, when in the first or second picking position, is preferably pivoted outward relative to the longitudinal center plane; and the second segment of the first or second suction arm, when in the first or second placing position, is preferably pivoted inward relative to the longitudinal center plane. As a result of this configuration, the lateral offset of the blister packs during their transfer is achieved by simple structural means.

It is preferred that the second segments and thus the blister packs held on the suction devices execute a rotational movement of substantially 180° around the second axis when the suction arms move from the first or second picking position to the first or second placing position or vice versa. This rotational movement ensures in a simple manner that the blister packs rotate by 180° around their centers during transfer. This guarantees in turn that the blister packs can be placed with their lidding foil side facing up.

Finally, it is preferred that the first segments execute a rotational movement of 60-180°, more preferably of 120-180°, around the first axis when the suction arms move from the first or second picking position to the first or second placing position. Whereas the place position is usually horizontal, the pick positions can be horizontal, vertical, or even slanted. The above-stated range of angles covers all possible arrangements of the pick positions. It is also conceivable that the suction devices could project at a slant from the second segment of the suction arms, so that the angle around which the first segment must pivot would then be smaller than that around which the blister packs must pivot as they move from the pick positions to the place position.

In another aspect of the present disclosure, the transfer unit for transferring blister packs comprises a first suction arm, which can be moved between a first picking position, in which it can pick a first blister pack from a pick position, and a first placing position, in which it can place the first blister pack in a first place position, and a second suction arm, which can be moved between a second picking position, in which it can pick a second blister pack from the same pick position, and a second placing position, in which it can place the second blister pack in a second place position. The first and second suction arms are arranged on either side of a longitudinal center plane of the transfer unit, wherein each suction arm comprises a first segment and a second segment. The first segment of each suction arm is mounted so that it can rotate around an associated first axis, which is perpendicular to the longitudinal center plane. The first segment of each suction arm comprises a section to which the second segment is attached so that it can rotate around a non-stationary second axis, which is substantially perpendicular to the first axis. A suction device for drawing up and holding a blister pack is arranged on the second segment. The suction arms are configured and actuated in such a way that the movement of the suction arms from the first or second picking position to the first or second placing position and back is a combined movement, which consists at least of a first rotational movement of the first segment and of the second segment around the first axis and a second rotational movement of the second segment around the second axis. The suction arms are configured and actuated in such a way that the suction devices of the first and second suction arms draw up the blister packs in the pick position by acting on a flat surface of each blister pack, whereupon the blister packs are placed from above in the first and second place positions with the flat surface facing up; wherein the pick position is arranged in the area of the longitudinal center plane, and the first and second place positions are outwardly offset from the longitudinal center plane. The second axis of the first suction arm is arranged in such a way that, during the first rotational movement of the first segment of the first suction arm, the second axis of the first suction arm moves in a first plane, which intersects the first place position or its lateral projection along a first straight line, which is laterally offset from the center of the first place position. The second axis of the second suction arm is arranged in such a way that, during the first rotational movement of the first segment of the second suction arm, the second axis of the second suction arm moves in a second plane, which intersects the second place position or its lateral projection along a second straight line, which is laterally offset from the center of the second place position.

This guarantees a reliable transfer of the blister packs, during which a single file of blister packs is split into two files in a simple manner and with high throughput.

The suction arms are preferably configured and actuated so that the blister packs in the pick position are picked from above by the suction devices of the first and second suction arms and also placed from above in the first and second place positions. Because the blister packs are picked from above, the blister packs in the pick position can lie flat. The placing of the blister packs in the place positions from above guarantees the most flexible possible release time of the blister packs by the suction devices.

In a preferred embodiment, the second segment of the first or second suction arm, when in the first or second picking position, is pivoted inward relative to the longitudinal center plane, and the second segment of the first or second suction arm, when in the first or second placing position, is pivoted outward relative to the longitudinal center plane. As a result of this configuration, the lateral offset of the blister packs during transfer is achieved by simple structural means.

It is preferred that the second segments and thus the blister packs held on the suction devices execute a rotational movement of substantially 180° around the second axis when the suction arms move from the first or second picking position to the first or second placing position or vice versa. This rotational movement guarantees in a simple manner that the blister packs rotate by 180° around their centers during their transfer. This guarantees in turn that the blister packs can be placed with the lidding foil side facing up.

The first segments preferably execute a rotational movement of 60-180°, more preferably of 120-180°, around the first axis when the suction arms move from the first or second picking position to the first or second placing position or vice versa. Whereas the placing positions are usually horizontal, the pick position can be horizontal, vertical, or even slanted. The stated range of angles covers all possible arrangements of the pick position. It is also conceivable that the suction devices could project at a slant from the second segment of the suction arms, so that the angle around which the first segment must pivot would then be smaller than that around which the blister packs must pivot as they travel from the pick position to the place positions.

In a preferred embodiment, the first and second suction arms are actuated in such a way that the first and section suction arms execute opposite back-and-forth pivoting movements. The throughput of the transfer unit can be increased in this way.

To allow for adaptations to different formats of the blister packs and to different desired lateral offsets of the blister packs during their transfer, the suction arms can be supported so that they can be shifted in a direction parallel to the first axis.

It is preferred that the suction device of each suction arm comprise at least one suction head, which is attached to the second segment by means of at least one support arm. It is especially preferred that the at least one support arm be attached rigidly to the second segment.

To reduce the angle around which the first segment must travel, the at least one support arm can project downward at a slant from the second segment when in the first or second picking position and in the first or second placing position.

According to an aspect of the present disclosure, a method for transferring blister packs from a first and a second pick position to a common place position by means of a transfer unit comprises the following steps:

providing a first and a second blister pack in a first and a second pick position, wherein the blister packs in the first and second pick positions are arranged next to each other in a row, which is transverse to a longitudinal center plane of the transfer unit;

picking the first blister pack in the first pick position, moving the first blister pack, and placing the first blister pack in the place position; wherein the first blister pack is placed in the place position from above; wherein the first blister pack in the first pick position is outwardly offset from the longitudinal center plane; and wherein the first blister pack is placed in the place position after a rotation of 180° around its center in comparison to its orientation in the first pick position; and picking the second blister pack in the second pick position, moving the second blister pack, and placing the second blister pack in the place position; wherein the second blister pack is placed in the place position from above; wherein the second blister pack in the second place position is outwardly offset from the longitudinal center plane; and wherein the second blister pack is placed in the place position after a rotation of 180° around its center in comparison to its orientation in the second pick position.

This guarantees a reliable transfer of the blister packs, during which two files of blister packs are merged into one file in a simple manner and with high throughput.

In a preferred embodiment, the blister packs in the first and second pick positions are picked from above, the blister packs have the same side facing up both in the first and second pick positions and in the place position. These measures facilitate the picking and the placing of the blister packs. They also make it possible to use suction devices in the transfer unit to pick and hold the blister packs.

It is preferred that the place position be arranged in the area of the longitudinal center plane, and that the first and second blister packs acquire opposite lateral offsets transverse to the longitudinal center plane as they move from the first and second pick positions to the place position. As a result, the lateral offset of each blister pack can be reduced to half the distance between the pick positions. It is also possible, however, that only one blister pack could acquire a lateral offset as it moves from the first or second pick position to the place position, whereas the other blister pack would be transferred without any lateral offset.

In another aspect of the present disclosure, a method for transferring blister packs from a common pick position to a first and second place position by means of a transfer unit comprises the following steps:

providing a first blister pack in the pick position;

picking the first blister pack in the pick position, moving the first blister pack, and placing the first blister pack in the first place position; wherein the first blister pack is placed in the first place position from above; wherein the first blister pack in the first place position is outwardly offset from the longitudinal center plane of the transfer unit; and wherein the first blister pack in the first place position is placed after a rotation of 180° around its center in comparison to its orientation in the pick position;

providing the second blister pack in the pick position;

picking the second blister pack in the pick position, moving the second blister pack, and placing the second blister pack in the second place position; wherein the second blister pack is placed in the second place position from above; wherein the second blister pack in the second place position is outwardly offset from the longitudinal center plane; wherein the second blister pack in the second place position is placed after a rotation of 180° around its center in comparison to its orientation in the pick position; and wherein the blister packs in the first and second place positions are arranged next to each other in a row which is transverse to the longitudinal center plane.

This guarantees a reliable transfer of the blister packs, during which a single file of blister packs is split into two files in a simple manner and with high throughput.

In a preferred embodiment, the blister packs in the pick position are picked from above, and the blister packs are arranged in the pick position and in the first and second place positions with the same side facing up in each case. These measures facilitate the picking and placing of the blister packs. They also make it possible to use suction devices in the transfer unit to pick and hold the blister packs.

It is preferred that the pick position be arranged in the area of the longitudinal center plane, and that the first and second blister packs, during the movement from the pick position to the first and second place positions, acquire opposite lateral offsets transverse to the longitudinal center plane. As a result, the lateral offset of each blister pack can be reduced to half the distance between the place positions. It is also possible, however, for only one blister pack to acquire a lateral offset as it moves from the pick position to the place positions, whereas the other blister pack is transferred without a lateral offset.

Finally, it is preferred that the first and second blister packs in the first and second pick positions or in the common pick position be arranged with the lidding foil side facing up. It is also preferred that the first and second blister packs be arranged with the lidding foil side facing up when they are in the common place position or in the first and second place positions. This configuration is especially well adapted to the use of suction grippers.

DETAILED DESCRIPTION

Figure 1:
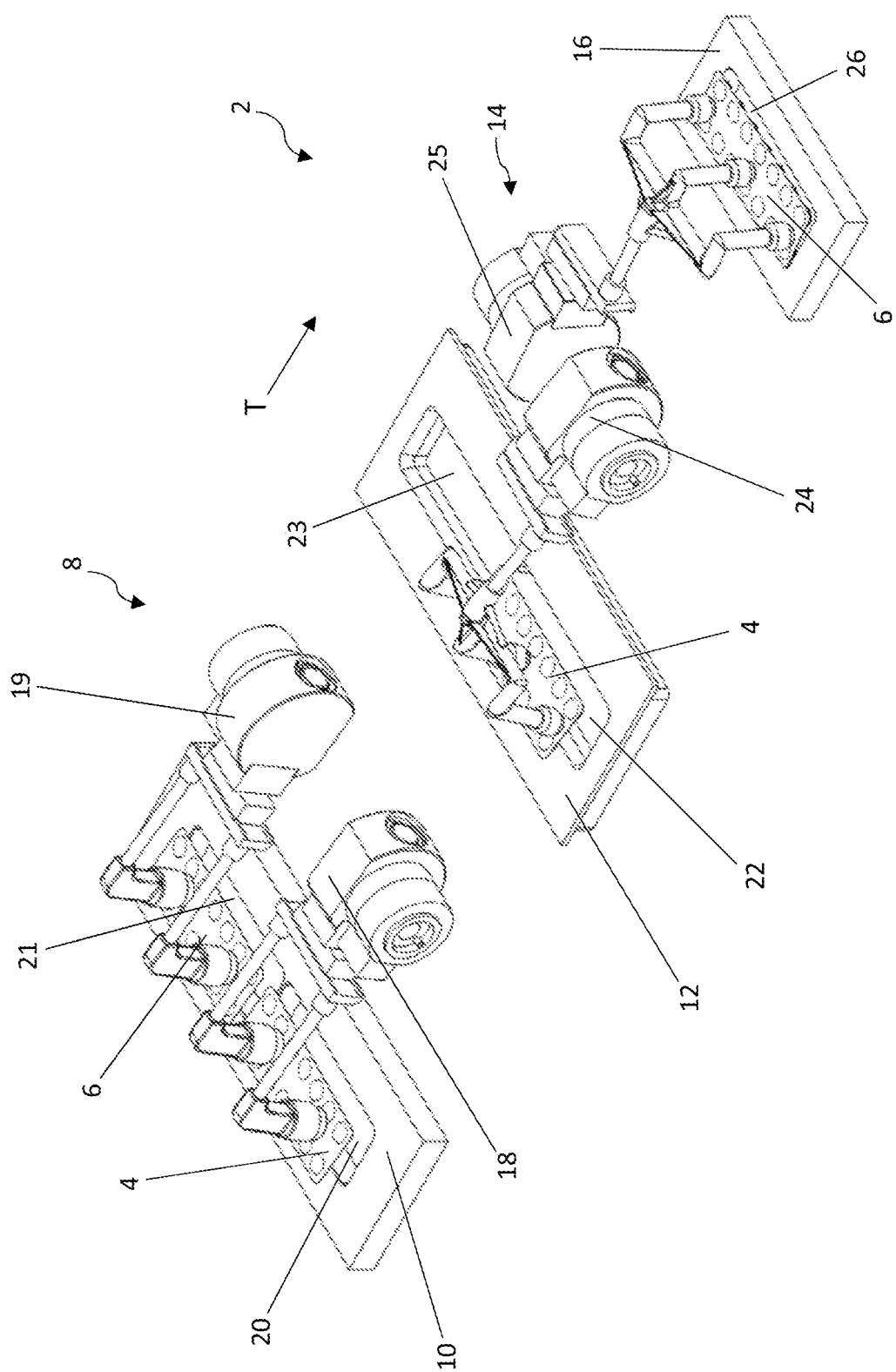
FIG. 1 is a schematic diagram, in perspective, of a device for transferring blister packs with a transfer unit according to the present disclosure.
Figure 2:
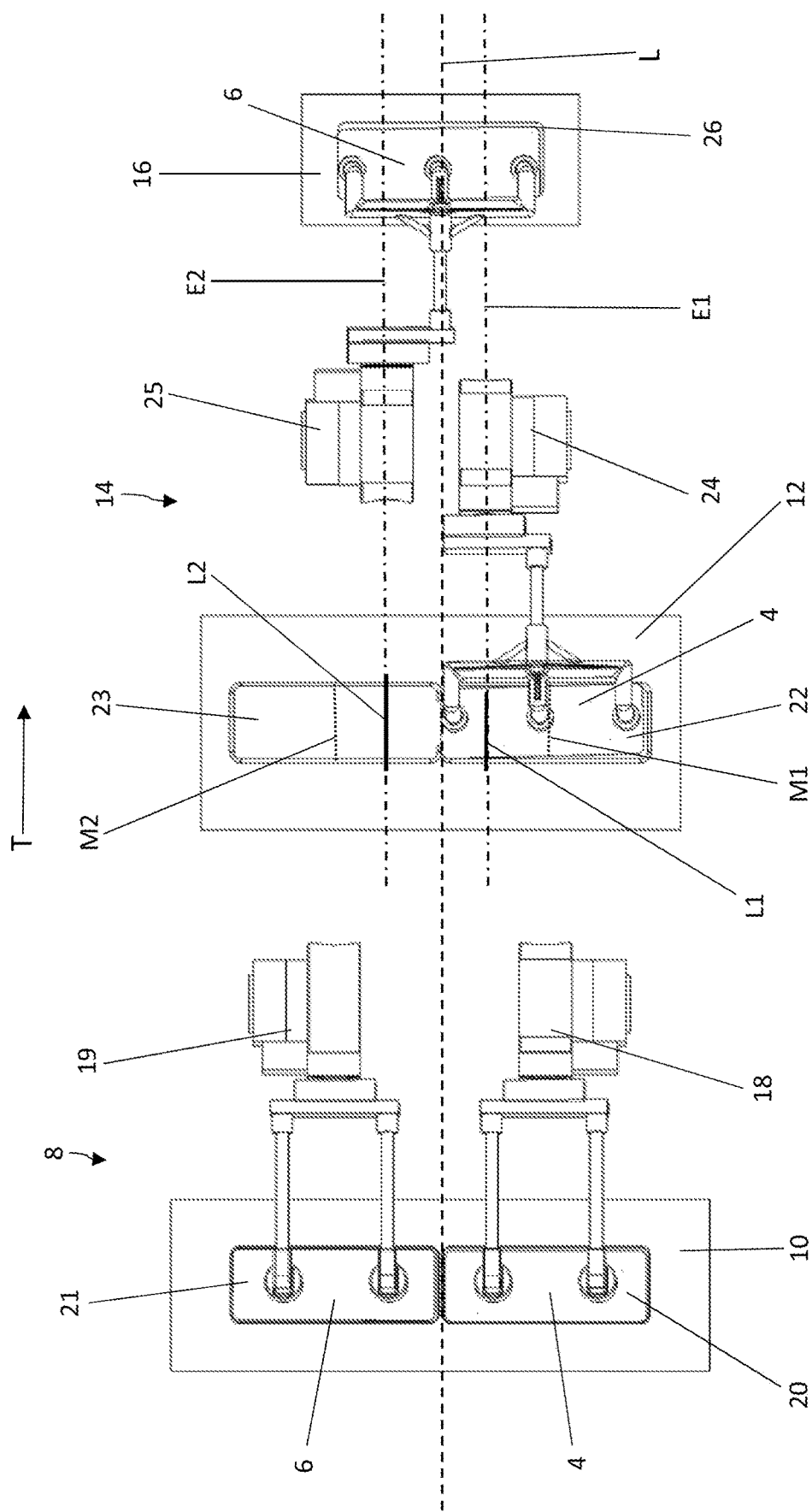
FIG. 2 is a top view of the device of FIG. 1.

FIGS. 1-6 show a device 2 for transferring blister packs 4, 6. In FIG. 1 and FIGS. 3-6, the device 2 for transferring blister packs 4, 6 is shown in various stages of the transfer process. FIG. 2 shows a top view of the device 2.

The device 2 for transferring blister packs 4, 6 comprises a first transfer unit 8, which transfers the blister packs 4, 6 from a stamping station 10 to an intermediate place element 12, and a second transfer unit 14, which transfers the blister packs 4, 6 from the intermediate place element 12 to a conveying means 16. The transfer direction of the blister packs 4, 6 is indicated in the figures by the arrow T.

The stamping station 10, the intermediate place element 12, and the conveying means 16 are illustrated merely schematically in the figures. The blister packs 4, 6 are usually provided in the area of the stamping station 10 immediately after the stamping operation. It is also possible, however, that a transport means (not shown) could be provided in the outlet area of the stamping station 10; after the stamping operation, this transport means would transport the blister packs 4, 6 onward until they are gripped by the first transfer unit 8. A transport means of this type preferably moves in stepwise fashion and in the transfer direction T. Finally, it also possible that the blister packs 4, 6 could be stored initially in an intermediate storage area (not shown), from which the transfer unit 8 would then remove the blister pack 4, 6 located above or in front of it.

The conveying means 16 preferably moves in the transfer direction T. The conveying means 16 can be configured as an endless packaging-goods chain, which moves continuously or preferably in stepwise fashion. It is also conceivable that the conveying means 16 could be configured as a linear motor system. If the conveying means 16 is moved in stepwise fashion or if the individual slides of the endless linear motor system stand still during the transfer at the position in which the blister packs 4, 6 are supplied to them, stacks of two or more blister packs 4, 6, one on top of the other, can be formed in the compartments of the conveying means 16. It is also conceivable that the blister packs 4, 6 could be transferred initially to a storage area (not shown) rather than directly to the conveying means 16.

The first transfer unit 8 comprises a first suction arm 18 and a second suction arm 19. The first suction arm 18 and the second suction arm 19 are arranged next to each other, transversely to the transfer direction T (see FIG. 2), on either side of the longitudinal center plane L of the device 2, i.e., of the transfer unit 8. The first suction arm 18 can be moved between a picking position, shown in FIG. 2, in which it can pick a first blister pack 4, 6 from a first ready position 20 in the stamping station 10, and a placing position, in which it can place the first blister pack 4 in a first intermediate place position 22 on the intermediate place element 12.

Figure 4:
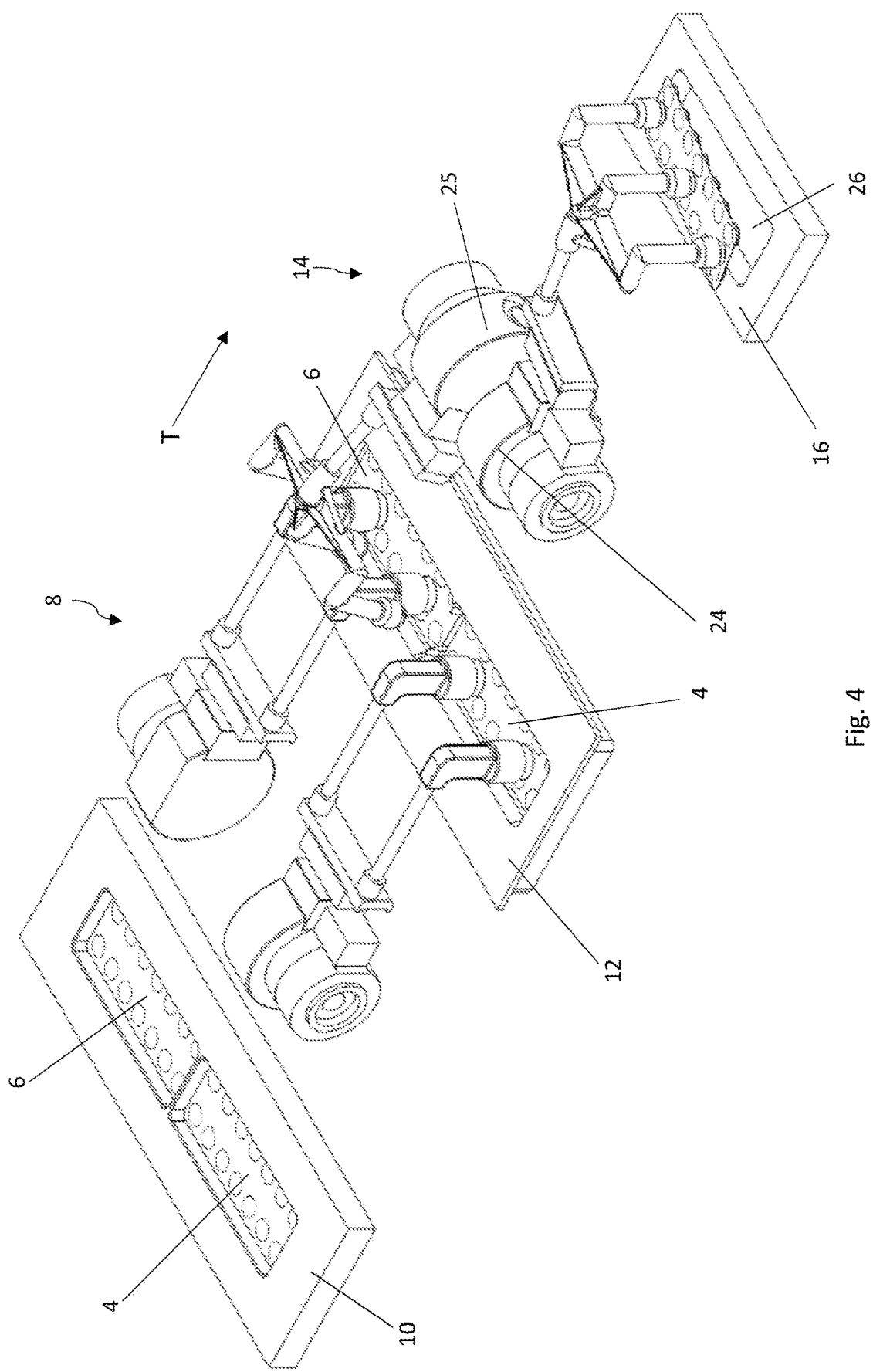

The second suction arm 19 can also be moved between a picking position, in which it can pick a second blister pack 6 from a second ready position 21 (see FIG. 2), and a placing position, in which it can place the second blister pack 6 in a second intermediate place position 23 on the intermediate place element 12. The placing positions of the first and second suction arms 18, 19 of the first transfer unit 8 are shown in FIG. 4.

In the preferred embodiment shown here, the suction arms 18, 19 are configured with mirror symmetry to the longitudinal center plane L and are actuated in such a way that they execute synchronous movements from the picking position to the placing position and back. As a result, the blister packs 4, 6 are gripped simultaneously from the two ready positions 20, 21 in the stamping station 10 by the first transfer unit 8 and also placed simultaneously in the two intermediate place positions 22, 23 on the intermediate place element 12. In addition to the embodiment illustrated here, there are many other possible ways in which the first transfer unit 8 can be configured. For example, it is conceivable that the two blister packs 4, 6 could be transferred simultaneously by means of a single suction arm. It is also conceivable that gripping devices could be used instead of the suction arms 18, 19. Finally, it is also possible that the two blister packs 4, 6 could be transferred in time-shifted fashion rather than simultaneously.

The second transfer unit 14 according to the present disclosure comprises a first suction arm 24 and a second suction arm 25, which are arranged next to each other in a row on either side of the longitudinal center plane L of the device 2, i.e., of the transfer unit 14. The first suction arm 24 can be moved between a picking position (see FIG. 2), in which it can pick the first blister pack 4 from the first intermediate place position 22 on the intermediate place element 12, and a placing position (which is reached shortly after the position shown in FIG. 4), in which it can place the first blister pack 4 in a final place position 26 on the conveying means 16.

The second suction arm 25 of the second transfer unit 14 can be moved between a picking position (which is reached shortly after the position shown in FIG. 4), in which it can pick the second blister pack 6 from the second intermediate place position 23 on the intermediate place element 12, and a placing position (see FIG. 2), in which it can place the second blister pack 6 in the same final place position 26 in which the first suction arm 24 places the first blister pack 4.

The two suction arms 24, 25 are preferably arranged and structured with mirror symmetry to the longitudinal center plane L of the device 2. The two suction arms 24, 25 execute opposite back-and-forth pivoting movements. When the first suction arm 24 is in the picking position, the second suction arm 24 is in its placing position or at least near its placing position. When the first suction arm 24 is in the placing position, the second suction arm 24 is in its picking position or at least near its picking position. The picking position of the first suction arm 24 differs in terms of its physical configuration in space from the picking position of the second suction arm 25. The placing position of the first suction arm 24 also differs from the placing position of the second suction arm 25 because of the mirror symmetry of the suction arms 24, 25 to the longitudinal center plane L.

The first and second ready positions 20, 21 in the stamping station 10, the first and second intermediate place positions 22, 23 on the intermediate place element 12, and the common final place position 26 on the conveying means 16 are each preferably configured to accommodate the shape of the blister packs 4, 6 to be transferred. In the case of conventional blister packs 4, 6, the above-mentioned positions will therefore have a substantially rectangular shape. In the embodiment shown here, the above-mentioned positions are each arranged in such a way that the longer sides of the positions are transverse to the transfer direction T. As can be seen in FIG. 2, the first and second ready positions 20, 21 are outwardly offset from the longitudinal center plane L of the device 2. The first and second intermediate place positions 22, 23 are outwardly offset from the longitudinal center plane L, preferably in an arrangement relative to the longitudinal center place L which is identical to that of the first and second ready positions 20, 21. The common final place position 26, however, is arranged in the area of the longitudinal center plane L. In the preferred embodiment shown here, the common final place position 26 is arranged symmetrically with respect to the longitudinal center plane L in such a way that the longitudinal center plane L intersects the final place position 26 in the center.

Details of the second transfer unit 14 will now be described more thoroughly with reference to FIGS. 7-10. As can be derived from FIG. 7, the first suction arm 24 comprises a first segment 30 and a second segment 31. The first segment 30 of the first suction arm 24 is mounted so that it can rotate around a first axis A1, which is perpendicular to the longitudinal center plane L. The first segment 30 of the first suction arm 24 comprises a section to which the second segment 31 is attached so that it can rotate around a non-stationary second axis A2, which is substantially perpendicular to the first axis A1. A suction device 34 for drawing up and holding the blister pack 4 is arranged on the second segment 31.

The second suction arm 25 also comprises a first segment 32 and a second segment 33. The first segment 32 of the second suction arm 25 is mounted so that it can rotate around the same first axis A1. The first segment 32 of the second suction arm 25 also comprises a section to which the second segment 33 is attached so that it rotate around another non-stationary axis A2', which is substantially perpendicular to the first axis A1. A suction device 34 for drawing up and holding a blister pack 6 is also arranged on the second segment 33.

The suction arms 24, 25 are configured and actuated in such a way that the movement of the suction arms 24, 25 from their associated picking positions to their associated placing positions and back is a combined movement, which consists at least of a first rotational movement of the first segment 30, 32 and of the second segment 31, 33 around the first axis A1 and a second rotational movement of the second segment 31, 33 around the associated second axis A2, A2'.

As can be seen in FIG. 2, the second axis A2 of the first suction arm 24 is arranged in such a way that, during the first rotational movement around the first axis A1, it moves in a first plane E1, which intersects the first intermediate place position 22 or its lateral projection along a first straight line L1. This first straight line L1 is laterally offset from the center M1 of the first intermediate place position 22. The lateral offset of this first straight line L1 proceeds from the center M1 of the first intermediate place position 22 toward the longitudinal center plane L.

The second axis A2' of the second suction arm 25 is arranged in such a way that, during the first rotational movement of the second suction arm 25 around the first axis A1, it moves in a second plane E2, which intersects the intermediate place position 23 or its lateral projection along a second straight line L2, which is laterally offset from the center M2 of the second intermediate place position 23. Here again, the lateral offset proceeds from the center M2 of the second intermediate place position 23 toward the longitudinal center plane L.

Figure 7:
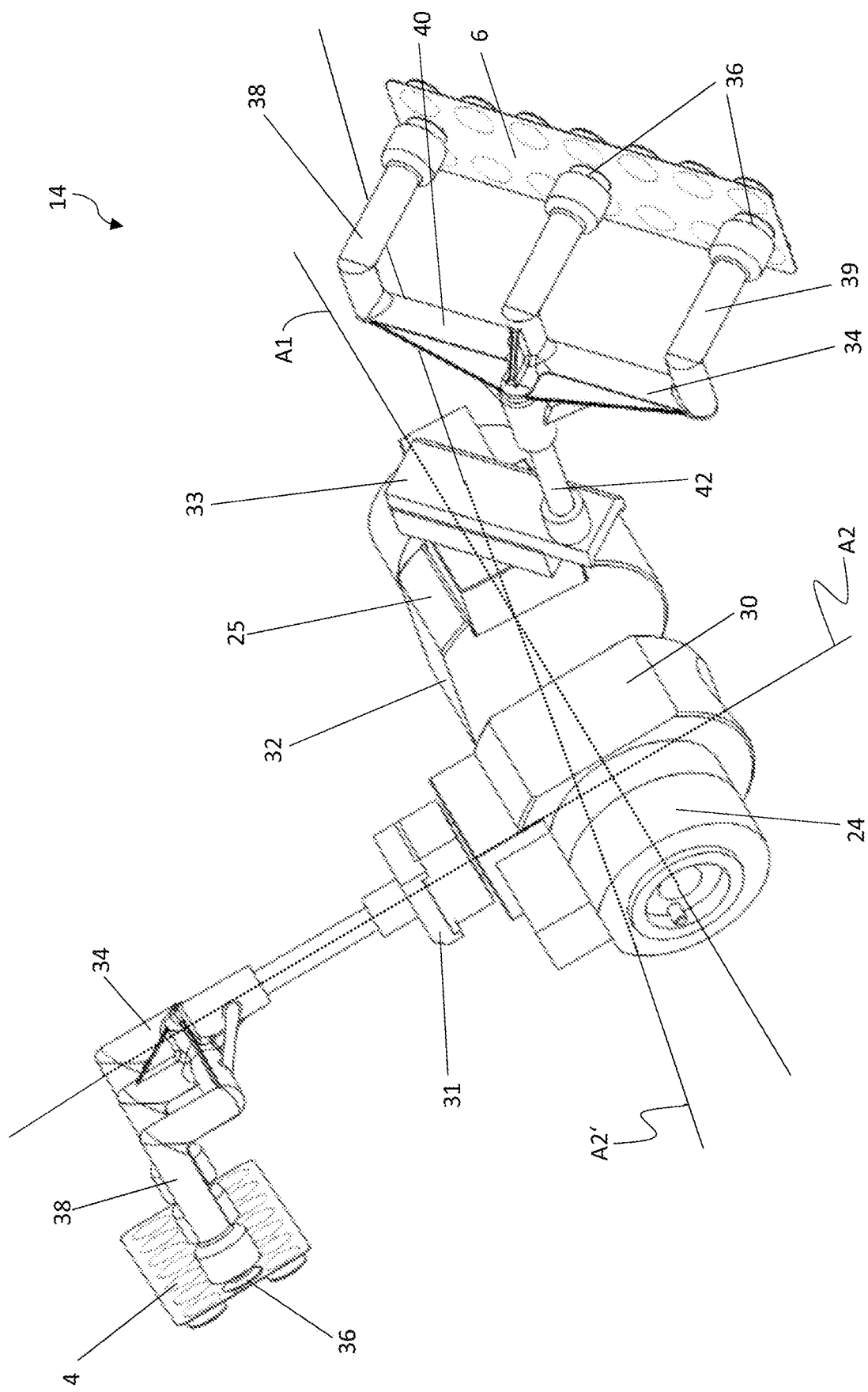
FIG. 7 is a schematic diagram, in perspective, of two suction arms, which are used in the transfer unit according to the present disclosure in the device according to FIG. 1.

As shown in FIG. 7, the suction device 34 of each suction arm 24, 25 comprises several suction heads 36, which are attached to the second segment 31, 33 by means of a support arm 38. It is also possible that only one suction head 36 could be present in each suction device 34. If several suction heads 36 are present, several separate support arms 38 to connect them to the second segment can also be provided. In the embodiment shown here, the support arm 38 is configured as a rake and comprises several fingers 39, on the tip of each of which a suction head 36 is arranged. The support 38 is preferably attached rigidly to the second segment 31, 33. In the embodiment shown here, the fingers 39 of the support arm 38 project perpendicularly from a common connecting strut 40. The connecting strut 40 is connected in turn to the second segment 31, 33 by a connecting member 42 perpendicular to the strut. In the embodiment shown, the connecting member 42 of the support arm 36 is connected perpendicularly to the second segment 31, 33. It is also conceivable that the connecting member 42 and thus the support arm 38 could project at a slant from the second segment 31, 33. In the associated picking and placing positions of the suction arms 24, 25, the connecting member 42 and thus the support arm 38 would then project downward at a slant. This would make it possible to reduce the angle around which the suction arm 24, 25 in question must travel around the first axis A1.

As can be derived from FIGS. 2 and 7, the second segment 31, 33 of the first or second suction arm 24, 25 is pivoted outward relative to the longitudinal center plane L when the arm is in the associated picking position. In concrete terms, it is the section of the second segment 31, 33 to which the support arm 38 is attached which is pivoted outward. It can also be seen that the second segment 31, 33 of the first or second suction arm 24, 25—in concrete terms, the section of the second segment 31, 33 to which the support arm 38 is attached—is pivoted inward relative to the longitudinal center plane L when the arm is in the associated placing position.

Details of a possible drive for the suction arm 24 will now be described on the basis of FIGS. 8-10.

Figure 8:
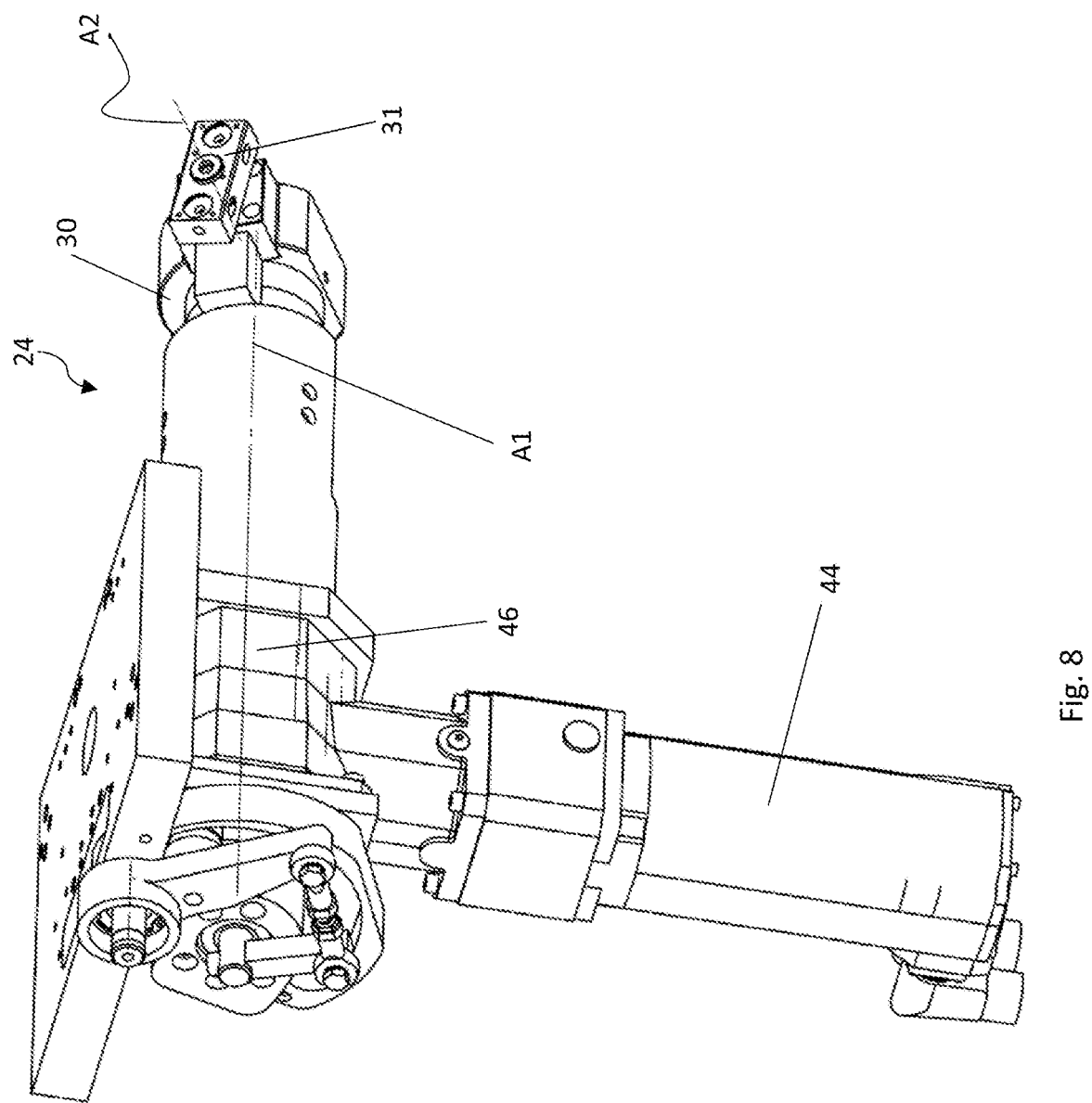
FIG. 8 is a schematic diagram, in perspective, of essential drive components of a suction arm according to FIG. 7.

In FIG. 8, a motor 44 can be seen, which pivots the first segment 30 back and forth around the first axis A1 by means of a gear unit 46. The second segment 31, which pivots around the second axis A2, is shown without the suction device 34 attached to it. The suction device 34 is preferably a format-dependent part, which can be exchanged depending on the type and size of the blister packs 4, 6 to be transferred. So that the support arm 48 of the suction device 34 can be attached to, and detached from, the second segment 31, a knurled screw 48 is preferably provided (see FIG. 9). So that further adaptations to different formats can be made, the suction arms 24, 25 can also be supported in such a way that they can be shifted in a direction parallel to the first axis A1 and/or in the longitudinal direction.

Figure 9:
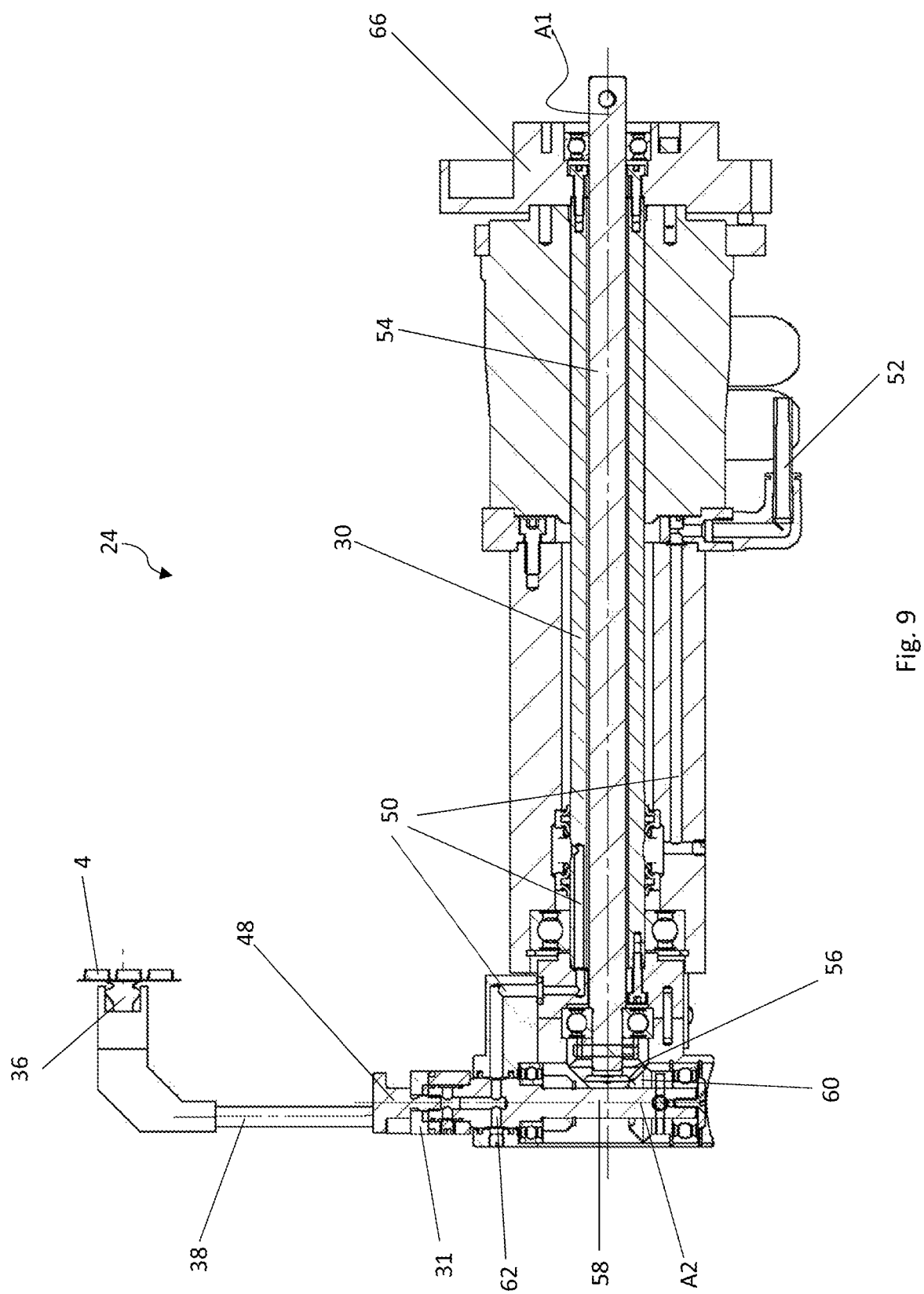
FIG. 9 is a cross-sectional view illustrating the internal structure of the suction arm according to FIG. 7.
Figure 10:
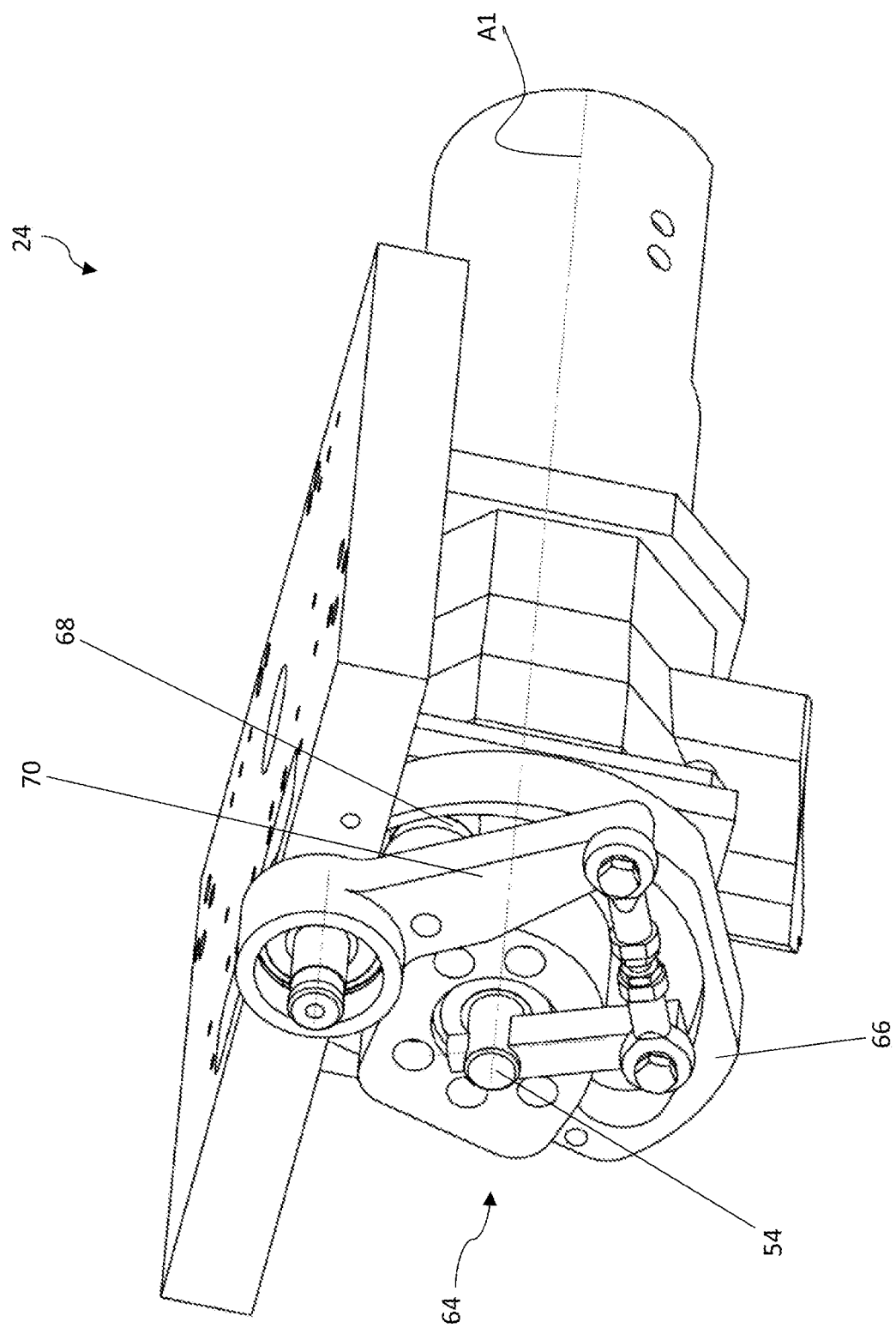
FIG. 10 is a schematic diagram, in perspective, of a mechanism for adapting the rotational movement of the second segment of the suction arm of FIG. 9 around the second axis.

The motor 44 and the gear unit 46 are not shown in the cross-sectional view according to FIG. 9. The first segment 30 of the suction arm 24, which is configured as a hollow shaft, is driven by the motor 44. When the motor 44 is actuated, the first segment 30 is pivoted back and forth around the first axis A1. The second segment 31 is supported in a section of the first segment 30 so that it can rotate around the second axis A2. In the first segment 30, air channels 50 are provided, which are connected to a vacuum connector 52 for the suction heads 36. A shaft 54, furthermore, is arranged in the interior of the first segment 30; a bevel gear 56 is rigidly attached to the end of the shaft facing the second segment 31.

The second segment 31 comprises a central shaft 58, which is rotatably supported in the end section of the first segment 30 and which, during a rotational movement of the first segment 30 around the first axis A1, turns along with the first segment 30. Another bevel gear 60 is permanently connected to the shaft 58; when the first and second segments 30, 31 rotate around the first axis A1, this gear meshes with the bevel gear 56. An annular groove 62 in the shaft 58 serves to produce a connection with the air channels 50 in the first segment 30 even during a rotational movement of the second segment 31 around the second axis A2.

When the first segment 30 and therefore also the second segment 31 are now pivoted around the first axis A1, the bevel gear 60 runs along the unmoving bevel gear 56 and thus causes the shaft 58 to rotate around the second axis A2. At a ratio of 1:1 between the bevel gears 56, 60, a pivoting of the first segment 30 and of the second segment 31 by 180° around the first axis A1, as is desired for the transfer processes shown in FIGS. 1-6, brings with it a rotation of the second segment 31 of 180° around the second axis A2. Thus the second segment 31 and the blister pack 4 held by the suction device 34 execute a rotational movement around the second axis A2 of substantially 180° when the suction arm 24 moves from its picking position to its placing position or vice versa. If the suction device 34 projects downward at a slant when the suction arms are in the picking and placing positions, the first segment 30 can, as it rotates around the first axis A1, travel around an angle of less than 180°, possibly of only 120°. In this case, the ratio between the bevel gears 56, 60 would have to be adjusted accordingly, because the second segment 31 must in all cases complete a rotational movement of 180° around the second axis A2.

The rotational movement of the second segment 31 around the second axis A2 in combination with the pivoting movement around the first axis A1 has the effect that the blister pack 4 in question is gripped by the suction head 36 on one side, preferably on the flat surface of the lidding foil side, and can then be placed from above in the final place position 26. As this is happening, the blister pack 4 completes a 180° rotation around its center.

In a departure from the basic principle described so far, it is desirable for the second segment 31 not to execute any rotational movement around the second axis A2 in the end phases of the pivoting movement around the first axis A1. This reason for this is that, in terms of an effective picking and placing of the blister packs 4, it is advantageous for the blister packs 4 to be raised and lowered along a straight line in the end phases of their movements. To achieve this purpose, a mechanism 64 for adapting the course of the rotation of the second segment 31 around the second axis A2 can be provided in the second transfer unit 14.

This mechanism 64 will now be described in greater detail with reference to FIG. 10. In FIG. 10, the end of the first segment 30, i.e., the end to which the second segment 31 and the suction device 34 are attached, is not shown for the sake of clarity. The mechanism 64 comprises a cam disk 66, which rotates around the first axis A1 jointly with the first segment 30. In the cross-sectional view of FIG. 9, this cam disk 66 is also shown but without the other components of the mechanism 64.

As can be seen with reference of the FIG. 10 again, the mechanism 64 also comprises a cam roller 68, which is articulated rotatably to a lever mechanism 70. The lever mechanism 70 is rigidly connected in turn to the inner shaft 54, on the other end of which the bevel gear 56 is arranged. When the cam disk 66 rotates around the first axis A1, the cam roller 68 runs along the cam disk 66 and thus causes a corresponding deflection of the lever mechanism 70, which results in turn in a rotation of the shaft 54 around the first axis A1. The mechanism 64 is configured in such a way that, in the initial and final phases of the rotational movement of the first segment 30 and thus of the cam disk 66 around the first axis A1, the shaft 54 and thus the bevel gear 56 move along at the same angular velocity as the first segment 30. As a result, there is no relative movement between the bevel gear 56 and the bevel gear 60, which means that no rotational movement of the second segment 31 around the second axis A2 is initiated.

During the further course of the pivoting movement around the first axis, however, the mechanism 64 causes the shaft 54 to move in a direction opposite to the rotational direction of the first segment 30, as a result of which the rotational speed of the second segment 31 around the second axis A2 is faster in a certain phase than the rotational movement around the first axis A1. In this way, it is possible to suspend the rotational movement of the second segment 31 around the second axis A2 during the end phases of the pivoting movement around the first axis 1 and to compensate for this in the middle phase of the pivoting movement around the first axis A1 by increasing the rotational speed of the second segment 31 around the second axis A2. This guarantees that the blister packs 4 will always complete a rotational movement of 180° around the second axis A2.

There are, of course, many different ways in which the structure of the suction arm 24 and the associated drive described above can be modified. For example, the coupling between the pivoting movement of the first segment 30 around the first axis A1 and the rotational movement of the second segment 31 around the second axis A2 can also be achieved by means of different mechanical components. It is also conceivable that two separate servo motors could be provided, one for the drive of the first segment 30, another for the drive of the second segment 31.

The structure of the suction arm 25 is substantially mirror-symmetric to that of the suction arm 24, wherein the first segment carries the designation 32, the second segment the designation 33, and the second axis the designation A2'.

The sequence of steps of a transfer process with the above-described device 2 will now be explained in greater detail with reference to FIGS. 1-6. The blister packs 4, 6 in the two ready positions 20, 21 in the stamping station 10 are picked simultaneously by the first and second suction arms 18, 19 of the first transfer unit 8, moved to the first and second intermediate place positions 22, 23, and placed there. The blister packs 4, 6 in the ready positions 20, 21 are preferably picked from above by the first transfer unit 8 and also placed from above in the intermediate place positions 22, 23 on the intermediate place element 12.

Because of the combined rotational movements around the two axes, which are perpendicular to each other, the blister packs 4, 6, which are arranged in a row in the ready positions 20, 21 on either side of the longitudinal center plane L, are placed in the intermediate place positions 22, 23 with the same side facing up as they did when in the ready positions 20, 21 but now with a rotation of 180° around their centers. Under certain circumstances, it is also possible that the blister packs 4, 6 could be provided in the ready positions 20, 21 with a vertical orientation, for example, or at a certain angle to the vertical, instead of being oriented horizontally. In this case, the suction arms 18, 19 would complete a pivoting movement around the first axis only around an angle of less than 180°, usually around an angle in the range of 60-180°.

Figure 3:
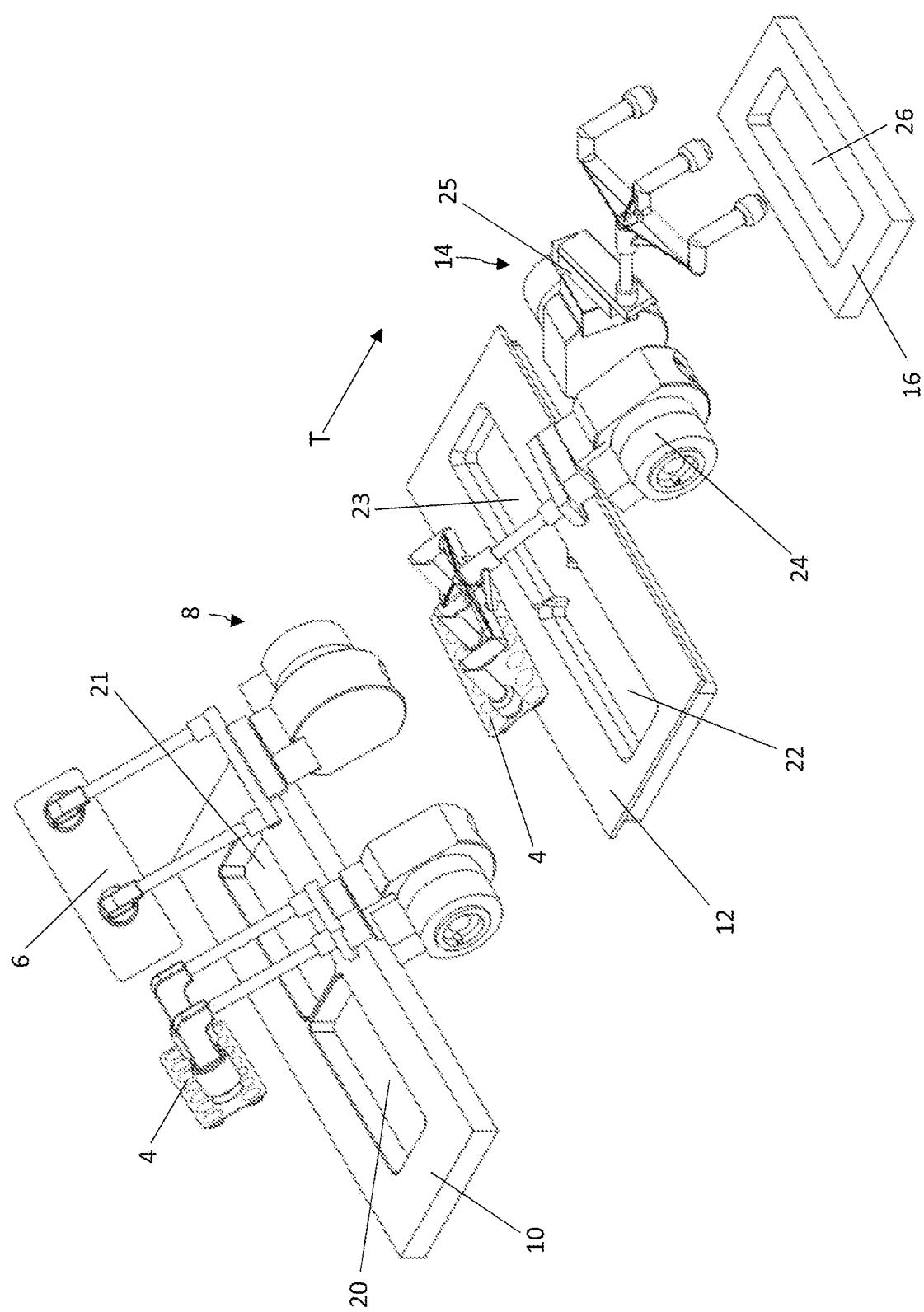
FIGS. 3-6 are schematic diagrams, in perspective, of the device of FIG. 1, showing various stages of the transfer process.
Figure 5:
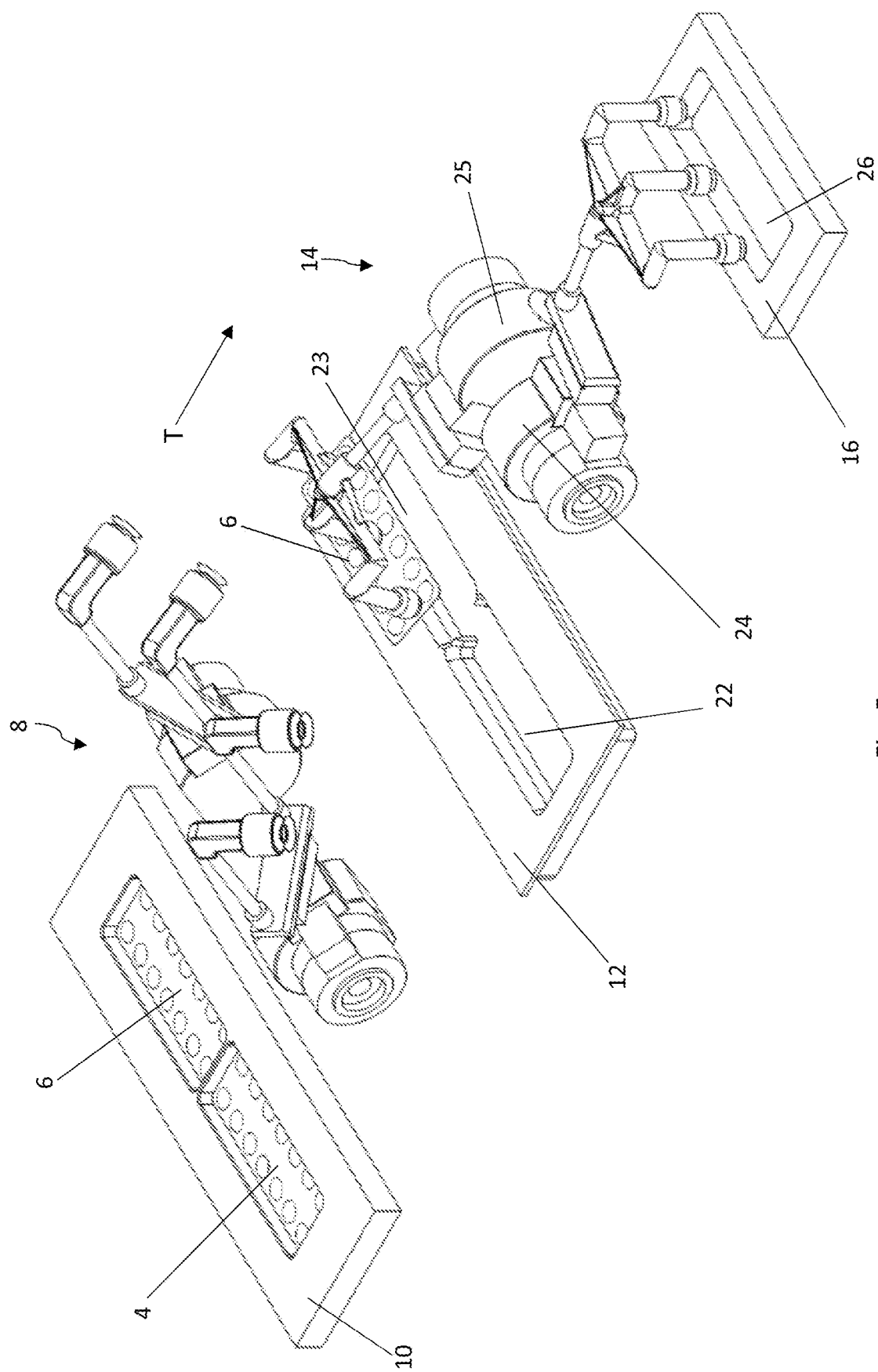
Figure 6:
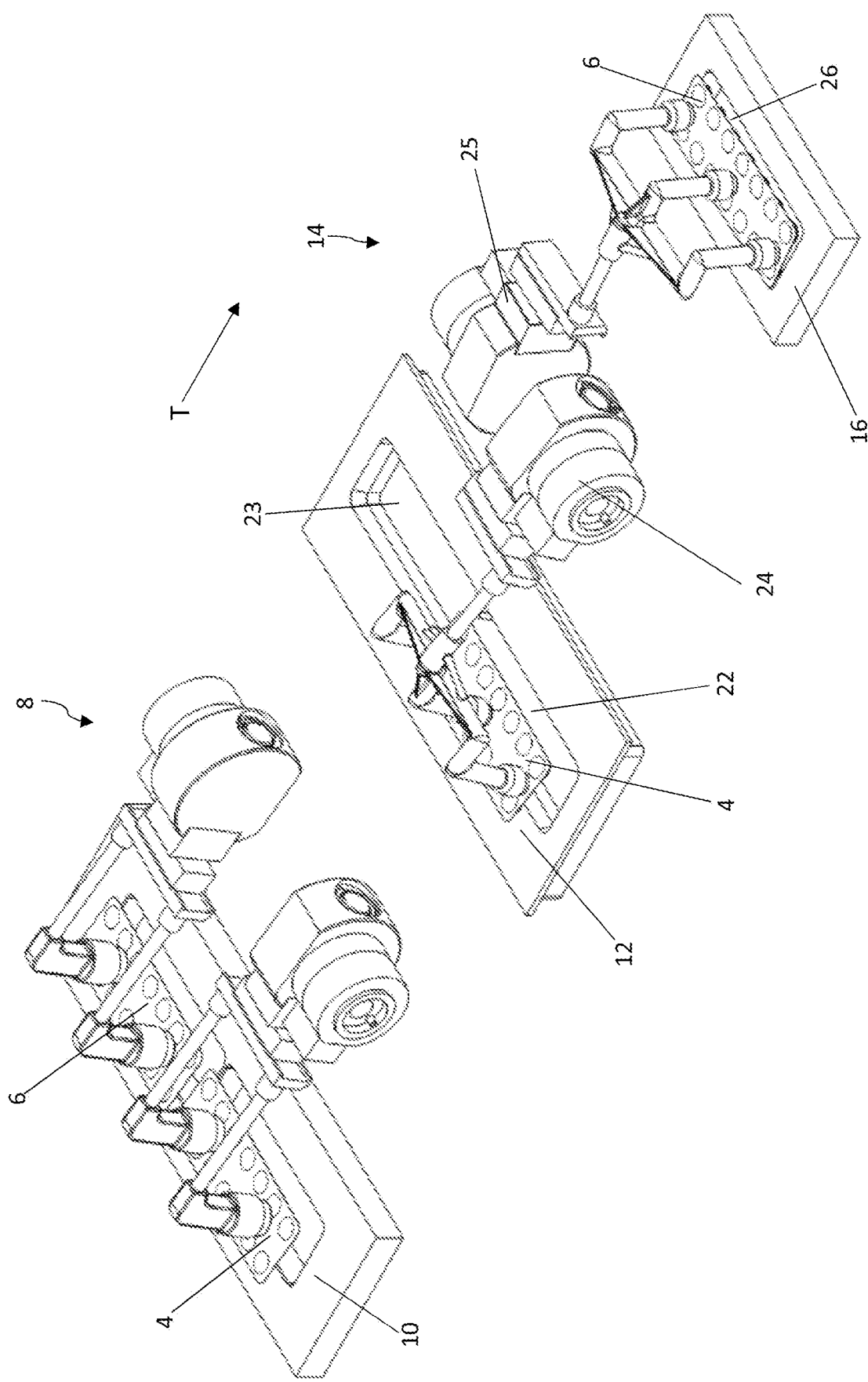

FIG. 1 shows the blister packs 4, 6 immediately after they have left the ready positions 20, 21. In FIG. 3, the blister packs 4, 6 are on the way from the ready positions 20, 21 to the intermediate place positions 22, 23, where they are placed, as shown in FIG. 4. In FIG. 5, the suction arms 18, 19 are on the way back to their picking positions; and in FIG. 6, the transfer cycle begins again from the beginning.

As previously explained, it is possible to use only a single suction arm to transfer both blister packs 4, 6 from the stamping station 10 to the intermediate place element 12 instead of the two suction arms 18, 19 moving in the same direction. It is also conceivable that the blister packs 4, 6 could be transferred by means of opposite movements of the suction arms 18, 19 of the first transfer unit 8 rather than simultaneously.

As soon as the blister packs 4, 6 are provided in the intermediate place positions 22, 23, the first blister pack 4 can be gripped there by the first suction arm 24 of the second transfer unit 14 and transferred to the final place position 26.

The first blister pack 4 in the first intermediate place position 22 is picked from above and also placed from above in the final place position 26 on the conveying means 16. The first blister pack 4 in the first intermediate place position 22 is outwardly offset from the longitudinal center plane L, and in the final place position 26 it is arranged in the area of the longitudinal center plane L. The first blister pack 4 has the same side facing up in the final place position 26 as it did in the first intermediate place position 22 but now with a rotation of 180° around its center. FIG. 1 shows the first blister pack 4 shortly after it has been gripped in the first intermediate place position 22. In FIG. 3, the first blister pack 4 is on the way from the first intermediate place position 22 to the final place position 26, where it is placed shortly after the time shown in FIG. 4. In FIG. 5, the first suction arm 24 is shown shortly after the placing step, whereas it is already on its return journey to its picking position. In FIG. 6, the cycle begins again from the beginning. The process is repeated as often as desired.

For the transfer of the second blister pack 6 from the second intermediate place position 23 to the common final place position 26 by means of the second suction arm 25, what was said above concerning the transfer of the first blister pack 4 by means of the first suction arm 24 applies here also in exactly the same way. The only difference is that the times at which the blister pack 6 is picked and at which the blister pack 6 is placed are substantially opposite to the times at which the first blister pack 4 is picked and placed. The two suction arms 24, 25 complete a pivoting movement around the same first axis A1, whereas the rotational movements of their second segments 31, 33 around the associated second axes A2, A2' proceed in opposite rotational directions. At the vertex of the rotational movement, as shown in the cross section according to FIG. 9, the blister packs are preferably parallel to the longitudinal center plane L.

The times at which the blister packs 4, 6 are picked from the intermediate place positions 22, 23 must be coordinated with the times at which the blister packs 4, 6 are placed on the intermediate place positions 22, 23 by the first transfer unit 8. To increase the throughput, it can be effective for the suction arm 24, 25 of the second transfer unit 14 to be picking the associated blister pack 4, 6 in the intermediate place position 22, 23 while the corresponding suction arm 18, 19 of the first transfer unit 24 is still in the area of the intermediate place position 22, 23. In a case such as this, it is necessary for the suction arms 18, 19, 24, 25 to have a geometry which allows the suction devices 34 of the suction arms 18, 19, 24, 25, to be offset from each other in the area of the intermediate place positions 22, 23 (see FIG. 4).

The structure and drive of the suction arms 18, 19 of the first transfer unit 8 are preferably substantially identical to the structure and drive of the suction arms 24, 25 of the second transfer unit 14, as described in detail above. The only difference is that the planes in which the second axes of the suction arms 18, 19 move intersect the ready positions 20, 21 and the intermediate place positions 22, 23 along straight lines which are centered with respect to the ready positions 20, 21 and the intermediate place positions 22, 23. As a result, the blister packs 4, 6 do not experience a lateral offset during their transfer.

FIGS. 11-17 show an alternative embodiment according to the present disclosure of the first transfer unit, here designated 108. In comparison to the previously described embodiment of the first transfer unit, the blister packs 4, 6 in this embodiment are provided in a common ready position 28 in the stamping station 10 and placed in the intermediate place positions 122, 123 with a lateral offset.

The embodiment according to the present disclosure of the first transfer unit 108 comprises a first suction arm 118 and a second suction arm 119, which are arranged next to each other in a row on either side of the longitudinal center plane L of the device 2, i.e., of the transfer unit 108. The first suction arm 118 can be moved between a picking position (see FIGS. 12 and 13), in which it can pick the first blister pack 4 from the common ready position 28, and a placing position (which is reached shortly after the position shown in FIG. 11), in which it can place the first blister pack 4 in a first intermediate place position 122 on the intermediate place element 112.

The second suction arm 119 can be moved between a picking position (see FIG. 11), in which it can pick the second blister pack 6 from the ready position 28, and a placing position (which is reached shortly after the position shown in FIG. 13), in which it can place the second blister pack 6 in a second intermediate place position 123.

The two suction arms 118, 119 are preferably arranged and structured with mirror symmetry to the longitudinal center plane L of the device 2, i.e., of the transfer unit 108. The two suction arms 118, 119 execute opposite back-and-forth pivoting movements. When the first suction arm 118 is in the picking position, the second suction arm 119 is in its placing position or at least near its placing position. When the first suction arm 118 is in the placing position, the second suction arm 119 is in its picking position or at least near its picking position. The placing position of the first suction arm 118 differs in terms of its physical configuration in space from the placing position of the second suction arm 119. The picking position of the first suction arm 118 also differs from the picking position of the second suction arm 119 because of the mirror symmetry of the suction arms 118, 119 to the longitudinal center plane L.

Figure 12:
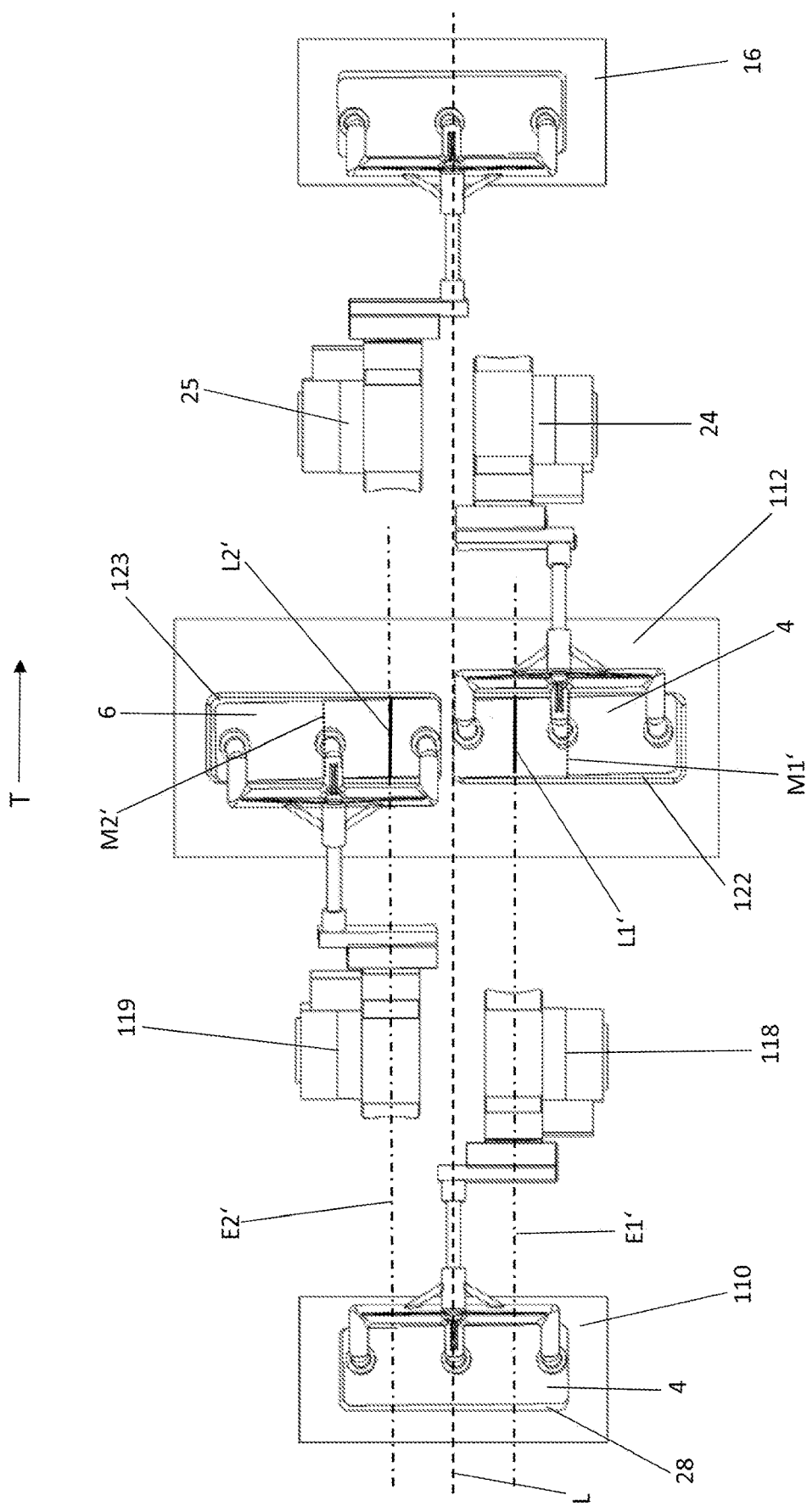
FIG. 12 shows a top view of the device of FIG. 1, wherein the transfer unit of FIG. 11 is used as the first transfer unit.

The first and second intermediate place positions 122, 123 on the intermediate place element 112 correspond with respect to their shape and arrangement to the intermediate place positions 22, 23 of the previously described embodiment. As can be seen in FIG. 12, the first and second intermediate place positions 122, 123 are outwardly offset from the longitudinal center plane L. The common ready position 28, however, is arranged in the area of the longitudinal center plane L. In the preferred embodiment shown here, the common ready position 28 is arranged symmetrically to the longitudinal center plane L in such a way that the longitudinal center plane L intersects the ready position 28 in the center.

Details of the transfer unit 108 according to the present disclosure will now be described more thoroughly with reference to FIGS. 14-17. As can be derived from FIG. 14, the first suction arm 118 comprises a first segment 130 and a second segment 131. The first segment 130 of the first suction arm 118 is mounted so that it can rotate around a first axis A1', which is perpendicular to the longitudinal center plane L. The first segment 130 of the first suction arm 118 comprises a section to which the second segment 131 is attached so that it can rotate around a non-stationary second axis A2", which is substantially perpendicular to the first axis A1'. A suction device 134 for drawing up and holding the blister pack 4 is arranged on the second segment 131.

The second suction arm 119 also comprises a first segment 132 and a second segment 133. The first segment 132 of the second suction arm 119 is mounted rotatably around the same first axis A1'. The first segment 132 of the second suction arm 119 also comprises a section to which the second segment 133 is attached so that it can rotate around a non-stationary second axis A2", which is substantially perpendicular to the first axis A1'. A suction device 134 for drawing up and holding a blister pack 6 is also arranged on the second segment 133.

The suction arms 118, 119 are configured and actuated in such a way that the movement of the suction arms 118, 119 from their picking positions to their associated placing positions and back is a combined movement, which consists at least of a first rotational movement of the first segment 130, 132 and of the second segment 131, 133 around the first axis A1' and a second rotational movement of the second segment 131, 133 around the associated second axis A2", A2"'.

As can be seen in FIG. 12, the second axis A2" of the first suction arm 118 is arranged in such a way that, during the first rotational movement around the first axis A1', it moves in a first plane E1', which intersects the first intermediate place position 122 or its lateral projection along a first straight line L1'. This first straight line L1' is laterally offset from the center M1' of the first intermediate place position 122. The lateral offset of this first straight line L1' proceeds from the center M1' of the first intermediate place position 122 toward the longitudinal center plane L.

The second axis A2"' of the second suction arm 119 is arranged in such a way that, during the first rotational movement of the second suction arm 119 around the first axis A1', it moves in a second plane E2', which intersects the second intermediate place positions 123 or its lateral projection along a second straight line L2', which is laterally offset from the center M2' of the second intermediate place positions 123. Here again, the lateral offset proceeds from the center M2' of the second intermediate place position 123 toward the longitudinal center plane L.

Figure 14:
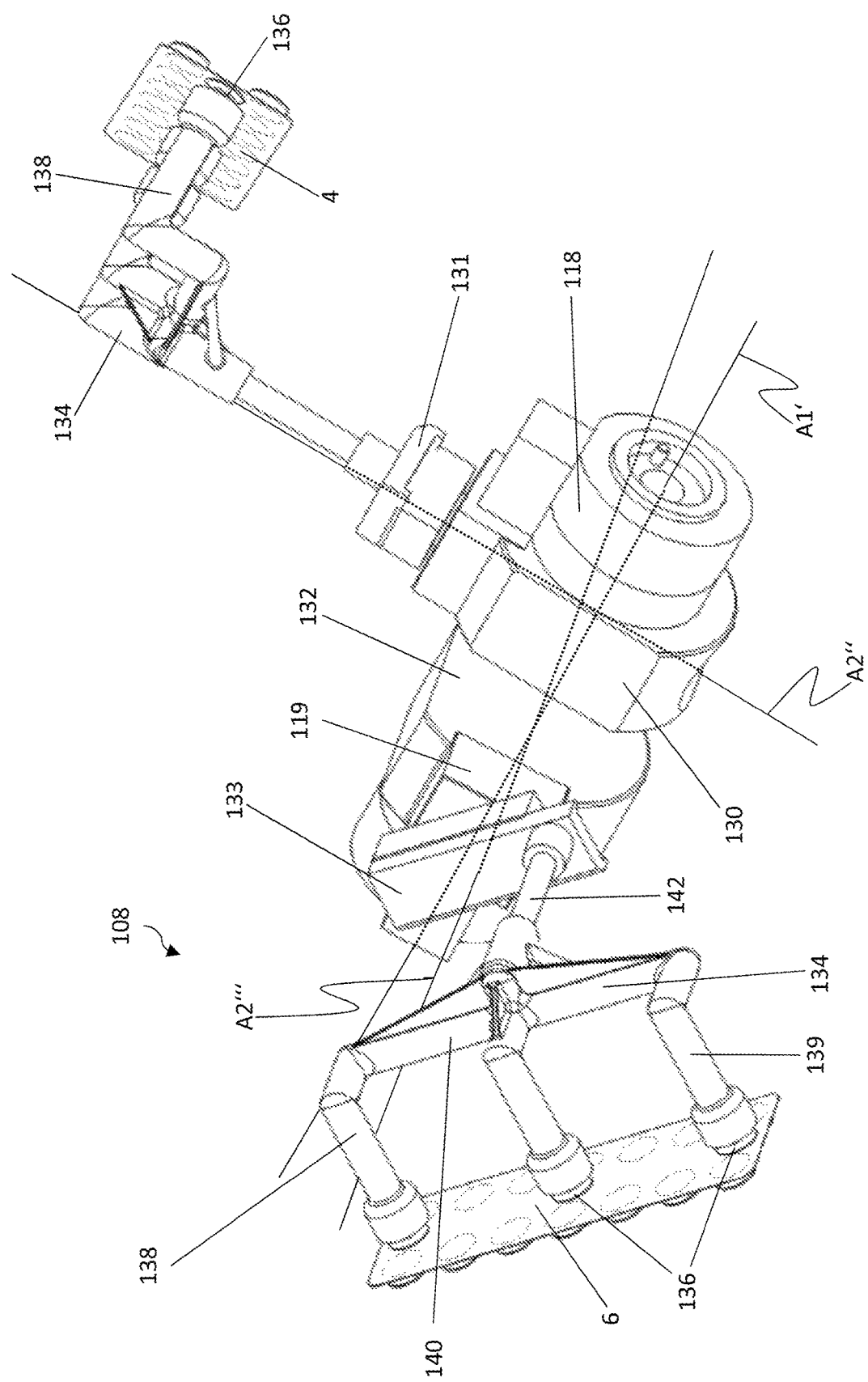
FIG. 14 is a schematic diagram, in perspective, of the suction arms of the transfer unit of FIG. 11.

As can be seen in FIG. 14, the suction device 134 of each suction arm 118, 119 comprises several suction heads 136, which are attached to the second segment 131, 133 by means of a support arm 138. It is also possible for only a single suction head 136 to be present on each suction device 134. If several suction heads 136 are present, several separate support arms 138 can be provided for connecting them to the second segment 131, 133. In the embodiment shown here, the support arm 138 is configured as a rake and comprises several fingers 139, on the tip of each of which a suction head 136 is arranged. The support arm 138 is preferably rigidly attached to the second segment 131, 133. In the embodiment shown here, the fingers 139 of the support arm 138 project perpendicularly from a common connecting strut 140. The connecting strut 140 is connected in turn to the second segment 131, 133 by means of a connecting member 142 perpendicular to the strut. In the embodiment shown here, the connecting member 142 of the support arm 138 is connected perpendicularly to the second segment 131, 133. It is also conceivable that the connecting member 142 and thus the support arm 138 could project at a slant from the second segment 131, 133. When the suction arms 118, 119 are in the associated picking and placing positions, the connecting member 142 and thus the support arm 138 would then each project downward at a slant. As a result, the angle around which the suction arm 118, 119 in question is required to rotate around the first axis A1' can be reduced.

As can be derived from FIGS. 12 and 14, the second segment 131, 133 of the first or second suction arm 118, 119 is, when in the associated picking position, pivoted inward relative to the longitudinal center plane L. In concrete terms, the section of the second segment 131, 133 to which the support arm 138 is attached is pivoted inward. It can also be seen that the second segment 131, 133 of the first or second suction arm 118, 119—in concrete terms, the section of the second segment 131, 133 to which the support arm 138 is attached—is, when in the associated placing position, pivoted outward relative to the longitudinal center plane L.

Details of a possible drive for the suction arm 118 will now be described with reference to FIGS. 15-17.

Figure 15:
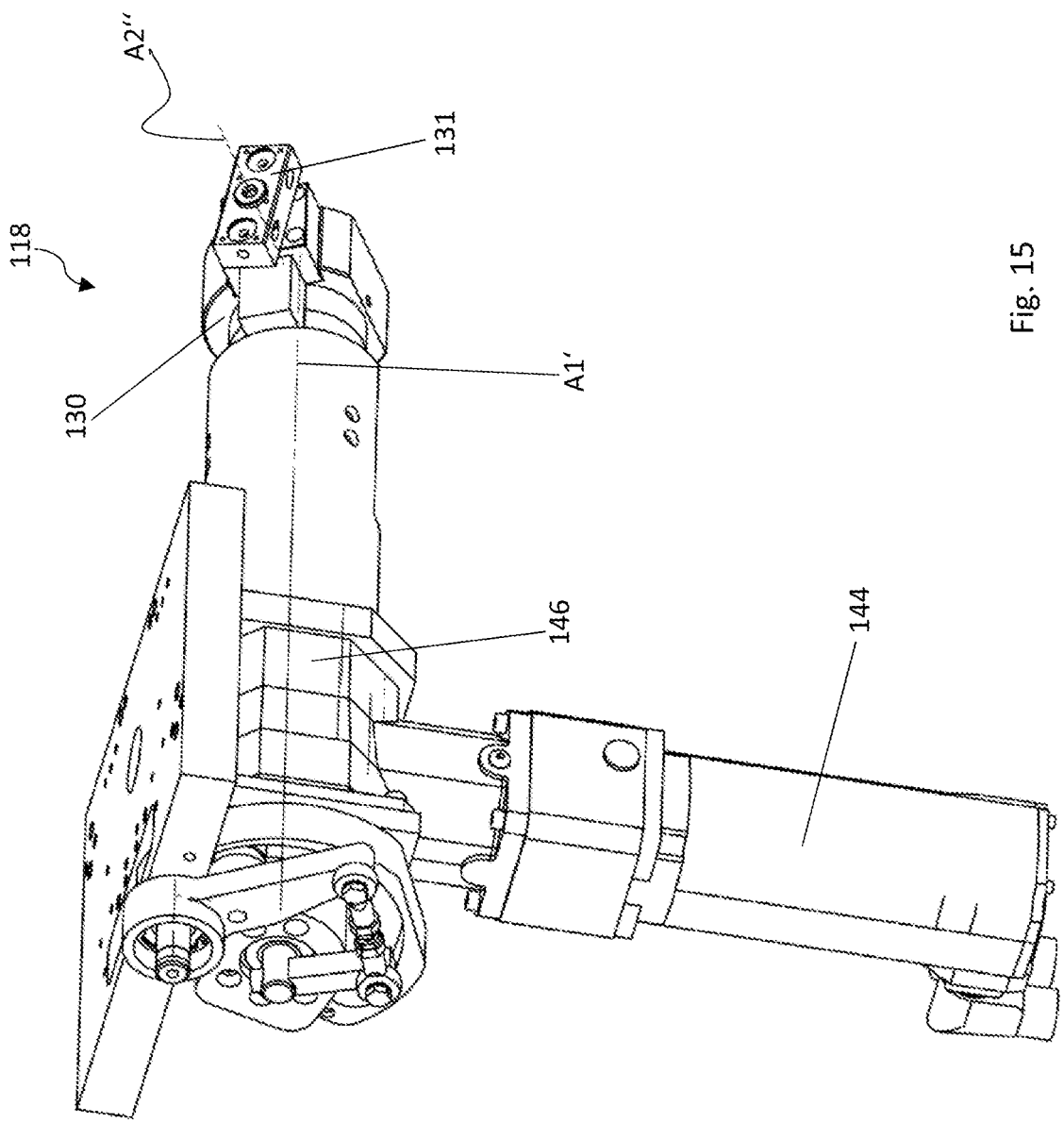
FIG. 15 is a schematic diagram, in perspective, of the essential drive components of the a suction arm according to FIG. 14.

In FIG. 15, a motor 144 can be seen, which pivots the first segment 130 back and forth around the first axis A1' by means of a gear unit 46. The second segment 131, which pivots around the second axis A2", is shown without the suction device 134 attached to it. The suction device 134 is preferably a format-dependent part, which can be exchanged depending on the type and size of the blister packs 4, 6 to be transferred and depending on the desired lateral offset of the blister packs 4, 6 during their transfer. So that the support arm 138 of the suction device 134 can be attached to, and detached from, the second segment 131, a knurled screw 148 is preferably provided (see FIG. 16). So that further adaptations to different formats can be made, the suction arms 24, 25 can also be supported in such a way that they can be shifted in a direction parallel to the first axis A1' and/or in the longitudinal direction.

Figure 16:
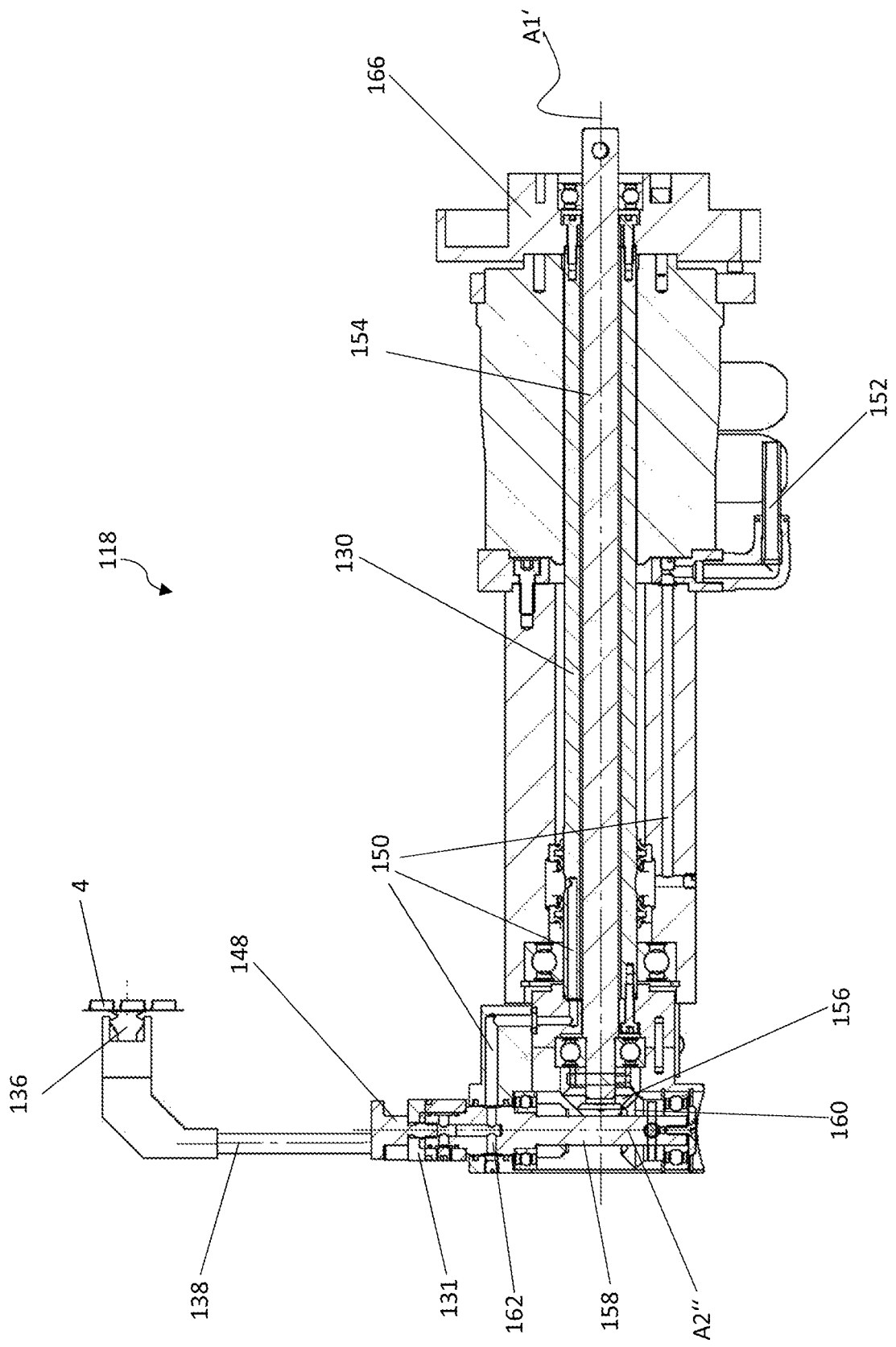
FIG. 16 is a cross-sectional view illustrating the internal structure of a suction arm according to FIG. 14.

The motor 144 and the gear unit 146 are not shown in the cross-sectional view according to FIG. 16. The first segment 130 of the suction arm 118, which is configured as a hollow shaft, is driven by the motor 144. When the motor 144 is actuated, the first segment 130 is pivoted back and forth around the first axis A1'. The second segment 131 is supported in a section of the first segment 130 so that it can rotate around the second axis A2". In the first segment 130, air channels 150 are provided, which are connected to a vacuum connector 152 for the suction heads 136. A shaft 54, furthermore, is arranged in the interior of the first segment 130; a bevel gear 156 is rigidly attached to the end of the shaft facing the second segment 131.

The second segment 131 comprises a central shaft 158, which is supported rotatably in the end section of the first segment 130 and which, when the first segment 130 rotates around the first axis A1', turns along with the first segment 130. Another bevel gear 160 is rigidly attached to the shaft 158; during a rotational movement of the first and second segments 130, 131 around the first axis A1', this bevel gear meshes with the bevel gear 156. An annular groove 162 in the shaft 158 serves to produce a connection to the air channels 150 in the first segment 130 even during a rotational movement of the second segment 131 around the second axis A2".

When the first segment 130 and therefore also the second segment 131 are now pivoted around the first axis A1', the bevel gear 160 runs along the unmoving bevel gear 156 and thus causes the shaft 158 to rotate around the second axis A2". At a ratio of 1:1 between the bevel gears 156, 160, a pivoting of the first segment 130 and of the second segment 131 by 180° around the first axis A1', as is desired for the transfer processes shown in FIGS. 11-13, brings with it a rotation of the second segment 131 by 180° around the second axis A2". Thus the second segment 131 and the blister pack 4 held by the suction device 134 execute a rotational movement around the second axis A2" of substantially 180° when the suction arm 118 moves from its picking position to its placing position or vice versa. If the suction device 134 projects downward at a slant when the suction arm is in the picking and placing positions, the first segment 130 can, as it rotates around the first axis A1', travel around an angle of less than 180°, possibly around an angle of only 120°. In this case, the ratio between the bevel gears 156, 160 would have to be adjusted accordingly, because the second segment 131 must in all cases complete a rotational movement of 180° around the second axis A2".

The rotational movement of the second segment 131 around the second axis A2" in combination with the pivoting movement around the first axis A1' has the effect that the suction head 36 can grip one side of the blister pack 4 in question, preferably the flat surface of the lidding foil side and then place it from above in the intermediate place position 122. As this is happening, the blister pack 4 completes a 180° rotation around its center.

In a departure from the basic principle described so far, it is desirable for the second segment 131 not to execute any rotational movement around the second axis A2" in the end phases of the pivoting movement around the first axis A1'. This reason for this is that, with respect to the effective picking and placing of the blister packs 4, it is advantageous for the blister packs 4 to be raised and lowered along a straight line in the end phases of their movement. To achieve this purpose, a mechanism 164 for adapting the course of the rotation of the second segment 131 around the second axis A2" can be provided in the transfer unit 108.

This mechanism 164 will now be described in greater detail with reference to FIG. 17. In FIG. 17, the end of the first segment 130, i.e., the end to which the second segment 131 and the suction device 134 are attached, is not shown for the sake of clarity. The mechanism 164 comprises a cam disk 166, which rotates around the first axis A1' jointly with the first segment 130. This cam disk 166 is also shown in the cross-sectional view of FIG. 16 but without the other components of the mechanism 164.

Figure 17:
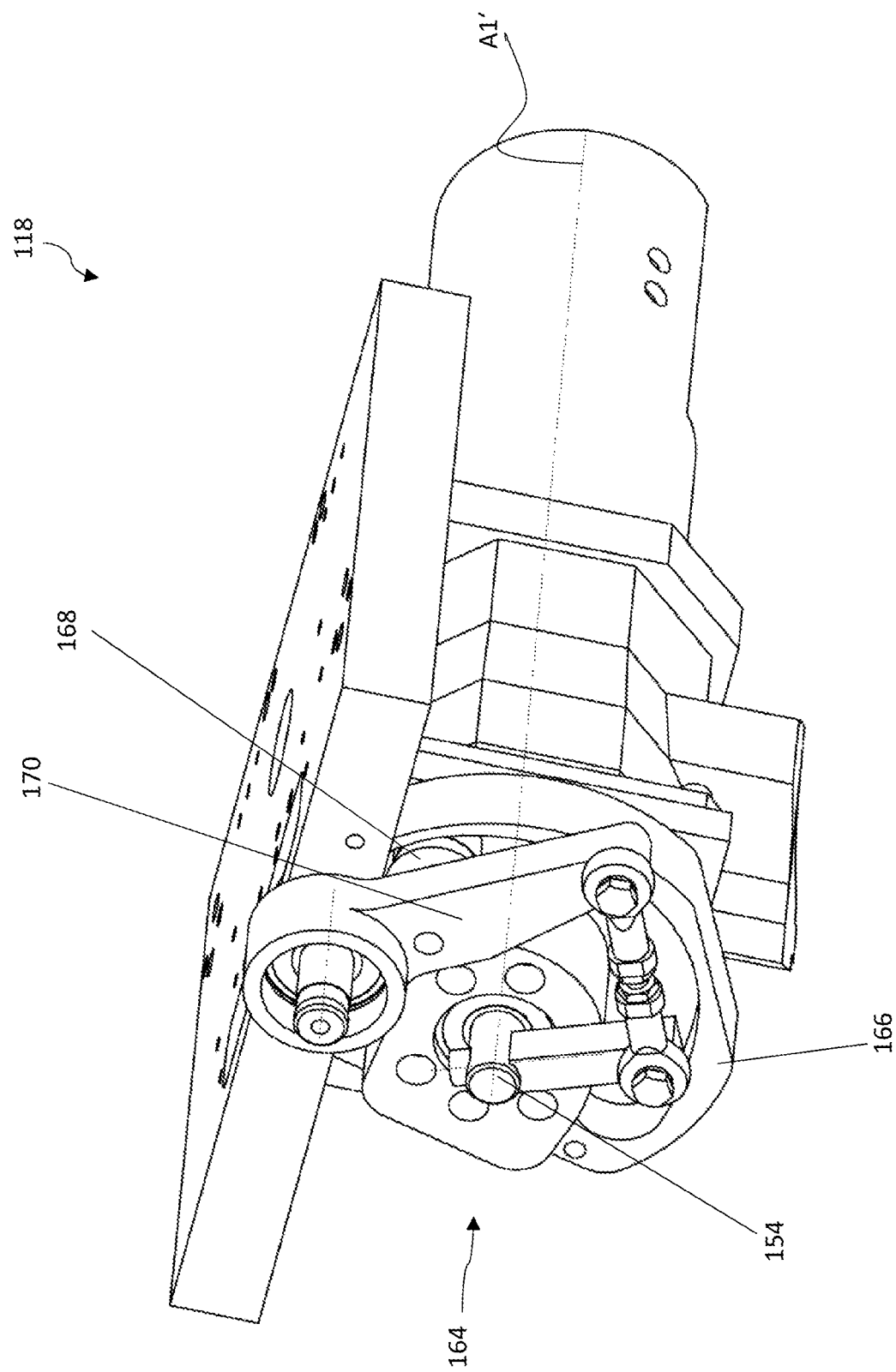
FIG. 17 is a schematic diagram, in perspective, of a mechanism for adapting the rotational movement of the second segment of the suction arm according to FIG. 16 around the second axis.

As can also be seen with reference to FIG. 17, the mechanism 164 also comprises a cam roller 168, which is articulated rotatably to a lever mechanism 170. The lever mechanism 170 is rigidly connected in turn to the inner shaft 154, on the other end of which the bevel gear 156 is arranged. When the cam disk 166 rotates around the first axis A1', the cam roller 168 runs along the cam disk 166 and thus causes a corresponding deflection of the lever mechanism 170, which results in turn in a rotation of the shaft 154 around the first axis A1'. The mechanism 164 is configured in such a way that, in the initial and final phases of the rotational movement of the first segment 130 and thus of the cam disk 66 around the first axis A1', the shaft 154 and thus the bevel gear 56 move along at the same angular velocity as the first segment 130. As a result, there is no relative movement between the bevel gear 156 and the bevel gear 160, which means that no rotational movement of the second segment 131 around the second axis A2" is initiated.

During the further course of the pivoting movement around the first axis A1', however, the mechanism 164 causes the shaft 154 to move in a direction opposite to the rotational direction of the first segment 130, as a result of which the rotational speed of the second segment 131 around the second axis A2" is faster in a certain phase than the rotational movement around the first axis A1'. In this way, it is possible to suspend the rotational movement of the second segment 131 around the second axis A2' during the end phases of the pivoting movement around the first axis A1' and to compensate for this in the middle phase of the pivoting movement around the first axis A1' by increasing the rotational speed of the second segment 131 around the second axis A2". This guarantees that the blister packs 4 will always complete a rotational movement of 180° around the second axis A2".

There are, of course, many different ways in which the structure of the suction arm 118 and the associated drive described above can be modified. For example, the coupling between the pivoting movement of the first segment 130 around the first axis A1' and the rotational movement of the second segment 131 around the second axis A2" can also be achieved by means of different mechanical components. It is also conceivable that two separate servo motors could be provided, one for the drive of the first segment 130, another for the drive of the second segment 131.

The structure of the suction arm 119 is substantially mirror-symmetric to that of the suction arm 118, wherein the first segment carries the designation 132, the second segment the designation 133, and the second axis the designation A2‴.

Figure 13:
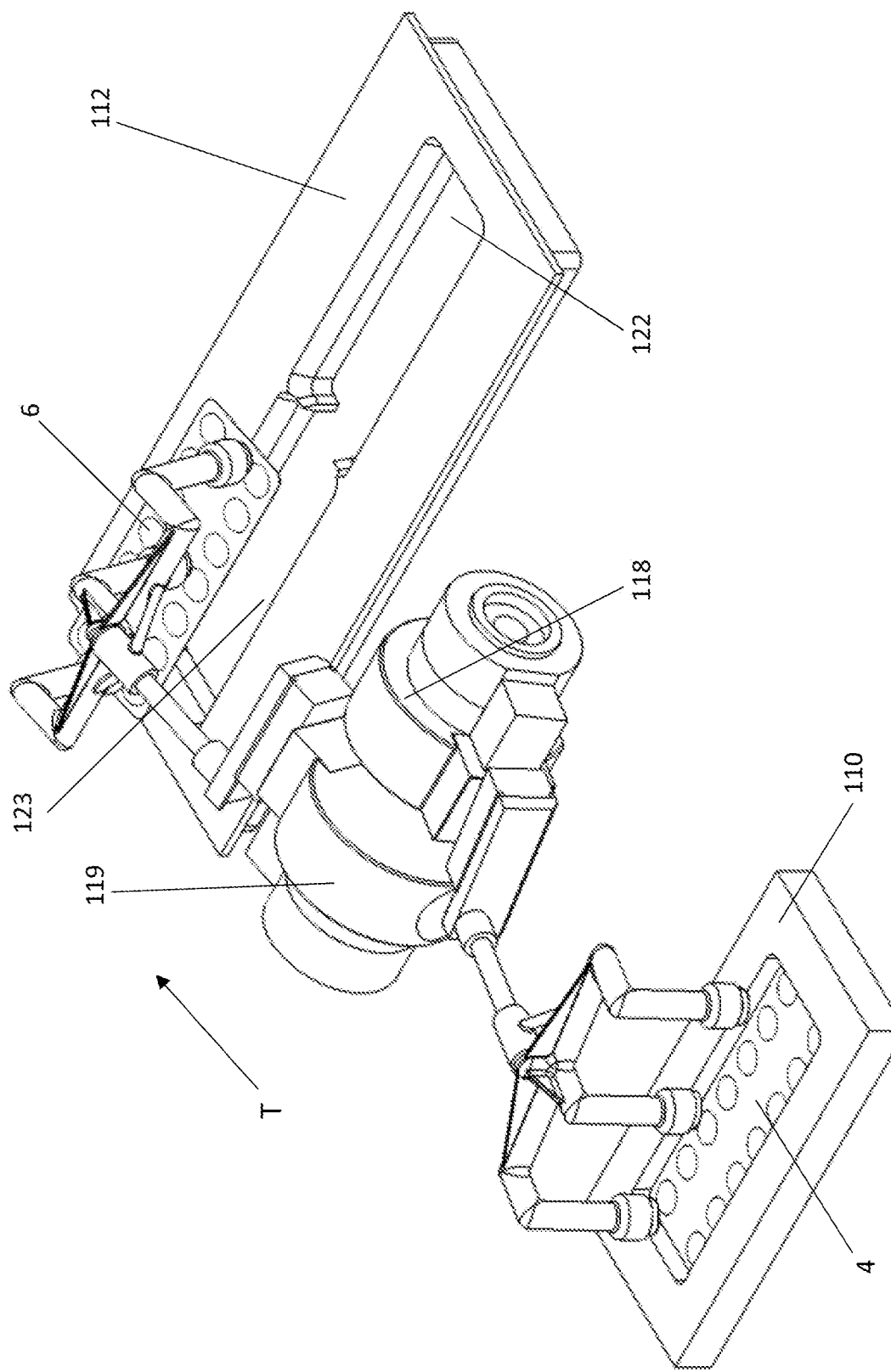
FIG. 13 is a schematic diagram, in perspective, of the transfer unit of FIG. 11 in a different stage of the transfer process.

The sequence of steps of a transfer process with the transfer unit 108 will now be explained in greater detail with reference to FIGS. 11-13. The blister packs 4, 6 in the ready position 28 in the stamping station 110 are picked successively by the first and second suction arms 118, 119 of the first transfer unit 108, moved to the first and second intermediate place positions 122, 123, respectively; and placed there.

The first blister pack 4 in the first ready position 28 is preferably picked from above and also placed from above in the first intermediate place position 122. The first blister pack 4 in the ready position 28 is arranged in the area of the longitudinal center plane L, and in the first intermediate place position 122 it is outwardly offset from the longitudinal center plane L. The first blister pack 4 is placed in the first intermediate place position 122 with the same side facing up as it did when in the ready position 28 but now with a 180° rotation around its center.

For the transfer of the second blister pack 6 from the ready position 28 to the second intermediate place position 123 by means of the second suction arm 119, what was said above concerning the transfer of the first blister pack 4 by means of the first suction arm 118 applies here also in exactly the same way. The only difference is that the times at which the blister pack 6 is picked and the time at which the blister pack 6 is placed are substantially opposite to the times at which the first blister pack 4 is picked and placed. The two suction arms 118, 119 complete a pivoting movement around the same first axis A1', whereas the rotational movements of their second segments 131, 133 around the associated second axes A2", A2‴ proceed in opposite rotational directions. At the vertex of the rotational movement, as illustrated in the cross-sectional view in FIG. 16, the blister packs 4, 6 are preferably parallel to the longitudinal center plane L.

Figure 11:
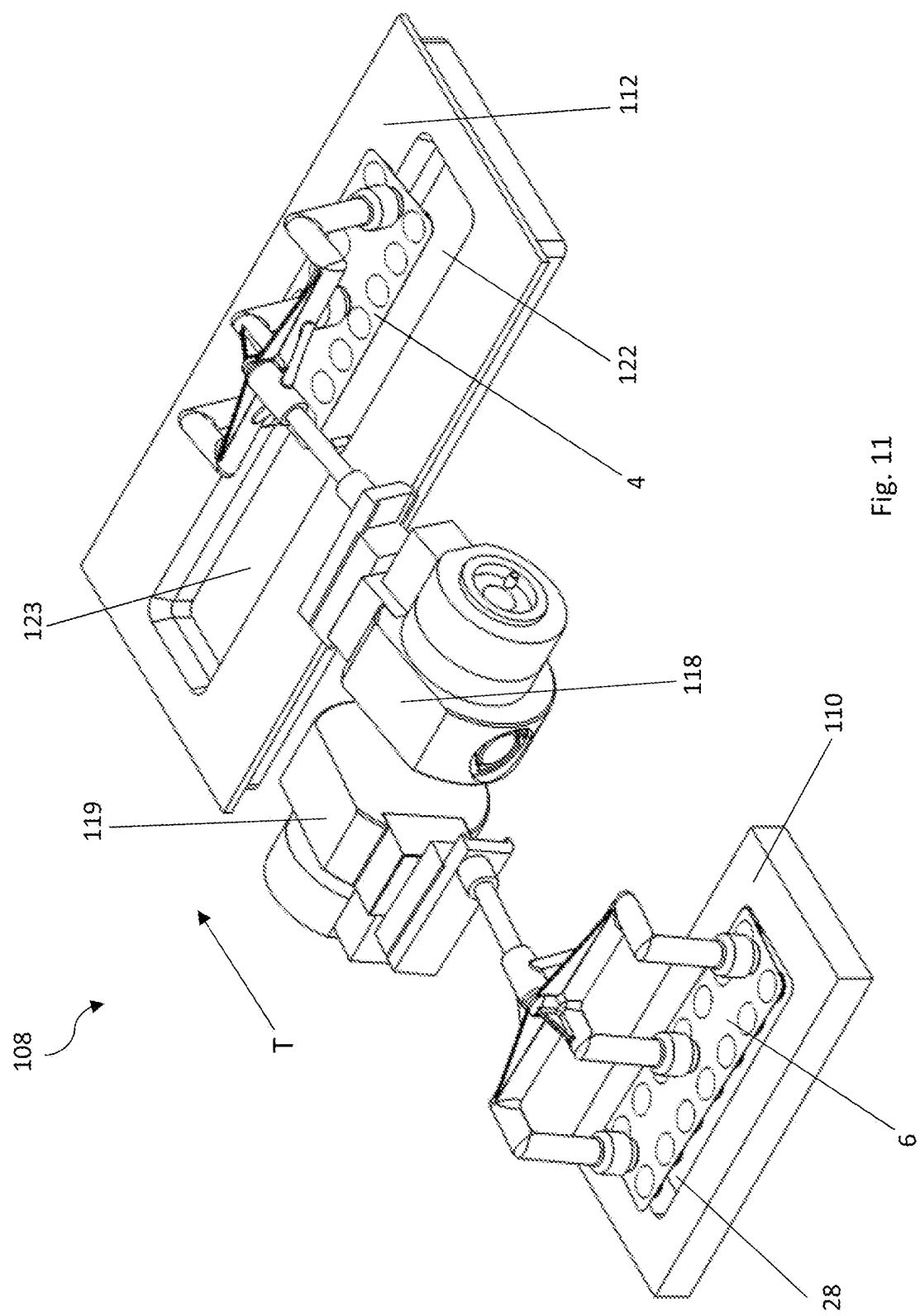
FIG. 11 is a schematic diagram, in perspective, of a variant of a transfer unit according to the present disclosure, which can be used in the device according to FIG. 1.

If the first transfer unit 108 according to FIG. 11 is used together with a second transfer unit 14, care must be taken to ensure that, when the two transfer units are actuated, the suction arms 118, 119, 24, 25 which are in the area of one of the intermediate place positions 122, 123 are those which act on different intermediate place positions 122, 123 (FIG. 12). In the diagram according to FIG. 12, therefore, the first suction arm 118 of the first transfer unit 108 and the first suction arm 24 of the second transfer unit 14 are preferably moved synchronously with respect to each other, whereas the second suction arm 119 of the first transfer unit 108 and the second suction arm 25 of the second transfer unit 14 are also moved synchronously with respect to each other.

The blister packs 4, 6 in the ready position 28 are preferably picked from above. Under certain conditions, it is also possible that the blister packs 4, 6 could be provided in the ready position 28 with a vertical orientation, for example, or at a certain angle to the vertical, instead of with a horizontal orientation. In this case, the suction arms 118, 119 complete a pivoting movement around the first axis A1' around an angle of less than 180°, usually an angle in the range of 60-180°. The ratio between the bevel gears 156, 160 must then be adapted accordingly to ensure that the second segment 131, 133 completes a full 180° rotation around the second axis A2″, A2‴ during this reduced pivoting movement around the first axis A1′.

Generally, the blister packs 4, 6 are preferably held in place in the ready position by a suitable retainer until they have been gripped by the suction arms. The retainer must release the blister packs at the proper time before the transfer movement.

Generally, the blister packs 4, 6 are preferably held in place in the intermediate place positions by suitable retainers until they have been gripped by the suction arms. The retainers must release the blister packs at the proper time before the transfer movement.

The transfer units 108, 14 according to the present disclosure can be used jointly in a device 2, as illustrated in FIG. 12. Each of them can also be used, however, with a different first or second transfer unit. Finally, it is also possible that the transfer units 108, 14 could be used by themselves. In this case, it is not necessary that the blister packs 4, 6 be placed in an intermediate location; and it is also possible that the transfer units 108, 14 could be used at other points of the packaging process.

For this reason, the general terms "pick position", "pick positions", "place position", and "place positions" are used in the attached claims. Within the scope of the description of the present figures, which are offered as examples, the claimed "pick positions" are the intermediate place positions 22, 23 of the transfer unit 14. The one common "pick position" is the common ready position 28 of the transfer unit 108. In addition, the claimed "place positions" are the intermediate place positions 122, 123 of the transfer unit 108. The one common "place position" is the common final place position 26 of the transfer unit 14.

In the case of the transfer unit 14, 108 according to the present disclosure, it is also possible to configure only one of the suction arms in the way described in detail above. The other suction arm could be configured to transfer blister packs in a straight line. In this case, the one suction arm would, during the transfer, produce a lateral offset of the blister packs of such a kind that the place position agrees with the place position of the other suction arm, or that the pick position agrees with the pick position of the other suction arm. By means of the one suction arm, therefore, either two files are merged into one file, or one file is split into two.

The blister packs 4, 6 usually contain tablets, capsules, or sugar-coated pills. The blister packs 4, 6 are usually sealed with a flat lidding foil, on which the suction heads 36 can act. It is also conceivable, however, that the blister packs 4, 6 could remain open at the top. This is possible especially in cases where, instead of tablets, other medical products such as syringes, ampoules, vials, or the like have been packaged. In the case of a blister pack 4, 6 without a lidding foil, it is advantageous for the suction heads 36 to be adapted to the shape of the product and to act directly on the product held in place in the blister pocket. The blister packs 4, 6 can also contain nonmedical products.

The invention claimed is:

1. A transfer unit for transferring blister packs comprising:
a first suction arm, which is movable between a first picking position, in which the first suction arm picks a first blister pack from a first pick position, and a first placing position, in which the first suction arm places the first blister pack in a place position; and
a second suction arm, which is movable between a second picking position, in which the second suction arm picks a second blister pack from a second pick position, and a second placing position, in which the second suction arm places the second blister pack in the same place position;
wherein the first and second suction arms are arranged on either side of a longitudinal center plane of the transfer unit;
wherein each of the first and second suction arms comprises a first segment and a second segment, wherein the first segment is mounted rotatably around an associated first axis, which is perpendicular to the longitudinal center plane;
wherein the first segment of each of the first and second suction arms comprises a section to which the second segment is attached, wherein the second segment is rotatable around a non-stationary second axis, which is substantially perpendicular to the first axis, wherein a suction device for sucking and holding a blister pack is arranged on the second segment;
wherein the first and second suction arms are configured and actuated in such a way that a movement of each the first and second suction arms from the first or second picking position to the first or second placing position and back is a combined movement, which comprises at least a first rotational movement of the first segment and of the second segment around the first axis and a second rotational movement of the second segment around the second axis;
wherein the first and second suction arms are configured and actuated in such a way that the suction devices of the first and second suction arms suck the blister packs in the first and second pick positions by acting on a flat surface of each of the blister packs, whereupon the blister packs are placed from above in the place position with the flat surface facing up;
wherein the first and second pick positions are outwardly offset from the longitudinal center plane, and the place position is arranged in an area of the longitudinal center plane;
wherein the second axis of the first suction arm is arranged in such a way that, during the first rotational movement of the first segment of the first suction arm, the second axis of the first suction arm moves in a first plane, which intersects the first pick position or a lateral projection thereof along a first straight line, which is laterally offset from a center of the first pick position; and
wherein the second axis of the second suction arm is arranged in such a way that, during the first rotational movement of the first segment of the second suction arm, the second axis moves in a second plane, which intersects the second pick position or a lateral projection thereof along a second straight line, which is laterally offset from a center of the second pick position.

2. The transfer unit of claim 1, wherein the first and second suction arms are configured and actuated in such a way that the blister packs in the first and second pick positions are picked from above by the suction devices of the first and second suction arms and also placed from above in the place position.

3. The transfer unit of claim 1, wherein the second segment of the first or second suction arm, when in the first or second picking position, is pivoted outward relative to the longitudinal center plane, and wherein the second segment of the first or second suction arm, when in the first or second placing position, is pivoted inward relative to the longitudinal center plane.

4. The transfer unit of claim 1, wherein the second segment and thus the blister pack held on the suction device executes a rotational movement of substantially 180° around the second axis when one of the suction arms moves from the first or second picking position to the first or second placing position or vice versa.

5. The transfer unit of claim 1, wherein the first segment executes a rotational movement of 60-180° around the first axis when one of the suction arms moves from the first or second picking position to the first or second placing position or vice versa.

6. The transfer unit of claim 1, wherein the first segment executes a rotational movement of 120-180° around the first axis when one of the suction arms moves from the first or second picking position to the first or second placing position or vice versa.

7. The transfer unit of claim 1, wherein the first and second suction arms are actuated in such a way that the first and second suction arms execute opposite back-and-forth pivoting movements.

8. The transfer unit of claim 1, wherein the first and second suction arms are supported such that they are shiftable in a direction parallel to the first axis.

9. The transfer unit of claim 1, wherein the suction device of each of the suction arms comprises at least one suction head, which is attached to the second segment by means of at least one support arm.

10. The transfer unit of claim 9, wherein the at least one support arm is rigidly attached to the second segment.

11. The transfer unit of claim 9, wherein the at least one support arm, when in the first or second picking position and in the first or second placing position, projects downward at a slant from the second segment.

12. A transfer unit for transferring blister packs comprising:
a first suction arm, which is movable between a first picking position, in which the first suction arm picks a first blister pack from a pick position, and a first placing position, in which the first suction arm places the first blister pack in a first place position; and
a second suction arm, which is movable between a second picking position, in which the second suction arm picks a second blister pack from the same pick position, and a second placing position, in which the second suction arm places the second blister pack in a second place position;
wherein the first and second suction arms are arranged on either side of a longitudinal center plane of the transfer unit;
wherein each of the first and second suction arms comprises a first segment and a second segment, wherein the first segment is mounted rotatably around an associated first axis, which is perpendicular to the longitudinal center plane;
wherein the first segment of each of the first and second suction arms comprises a section to which the second segment is attached such that the second segment is rotatable around a non-stationary second axis, which is substantially perpendicular to the first axis, wherein a suction device for sucking and holding a blister pack is arranged on the second segment;
wherein the first and second suction arms are configured and actuated in such a way that the movement of each of the first and second suction arms from the first or second picking position to the first or second placing position and back is a combined movement, which comprises at least a first rotational movement of the first segment and of the second segment around the first axis and a second rotational movement of the second segment around the second axis;
wherein the first and second suction arms are configured and actuated in such a way that the suction devices of the first and second suction arms suck the blister packs in the pick position by acting on a flat surface, whereupon the blister packs are placed in the first and second place positions with the flat surface facing up;
wherein the pick position is arranged in an area of the longitudinal center plane, and the first and second place positions are outwardly offset from the longitudinal center plane;
wherein the second axis of the first suction arm is arranged in such a way that, during a first rotational movement of the first segment of the first suction arm, the second axis of the first suction arm moves in a first plane, which intersects the first place position or a lateral projection thereof along a first straight line, which is laterally offset from a center of the first place position; and
wherein the second axis of the second suction arm is arranged in such a way that, during a first rotational movement of the first segment of the second suction arm, it moves in a second plane, which intersects the second place position or a lateral projection thereof along a second straight line, which is laterally offset from a center of the second place position.

13. The transfer unit of claim 12, wherein the first and second suction arms are configured and actuated in such a way that the blister packs in the pick position are picked from above by the suction devices of the first and second suction arms and also placed from above in the first and second place positions.

14. The transfer unit of claim 12, wherein the second segment of the first or second suction arm, when in the first or second picking position, is pivoted inward relative to the longitudinal center plane, and wherein the second segment of the first or second suction arm, when in the first or second placing position, is pivoted outward relative to the longitudinal center plane.

15. The transfer unit of claim 12, wherein the second segment and thus the blister pack held by the suction device executes a rotational movement of substantially 180° around the second axis when one of the suction arms moves from the first or second picking position to the first or second placing position or vice versa.

16. The transfer unit of claim 12, wherein the first segment executes a rotational movement around the first axis of 60-180° when one of the suction arms moves from the first or second picking position to the first or second placing position.

17. The transfer unit of claim 12, wherein the first segment executes a rotational movement around the first axis of 120-180° when one of the suction arms moves from the first or second picking position to the first or second placing position.

18. The transfer unit of claim 12, wherein the first and second suction arms are actuated in such a way that the first and second suction arms execute opposite back-and-forth pivoting movements.

19. The transfer unit of claim 12, wherein the first and second suction arms are supported such that they are shiftable in a direction parallel to the first axis.

20. The transfer unit of claim 12, wherein the suction device of each of the suction arms comprises at least one suction head, which is attached to the second segment by means of at least one support arm.

21. The transfer unit of claim 20, wherein the at least one support arm is rigidly attached to the second segment.

22. The transfer unit of claim 20, wherein the at least one support arm, when in the first or second picking position and in the first or second placing position, projects downward at a slant from the second segment.

23. A method for transferring blister packs from a first and a second pick position to a common place position by means of a transfer unit, comprising the steps of:

providing a first and a second blister pack in a first and a second pick position, wherein the first and second blister packs in the first and second pick positions are arranged next to each other in a row which is transverse to a longitudinal center plane of the transfer unit;

picking the first blister pack in the first pick position, moving the first blister pack, and placing the first blister pack in the place position, wherein the first blister pack is placed from above in the place position, wherein the first blister pack in the first pick position is outwardly offset from the longitudinal center plane, and wherein the first blister pack in the place position is placed with a rotation of 180° around a center of the first blister pack in comparison to an orientation of the first blister pack in the first pick position; and picking the second blister pack in the second pick position, moving the second blister pack, and placing the second blister pack in the place position, wherein the second blister pack is placed in the place position from above, wherein the second blister pack in the second pick position is outwardly offset from the longitudinal center plane and wherein the second blister pack in the place position is rotated by 180° around a center of the second blister pack in comparison to an orientation of the second blister pack in the second pick position.

24. The method of claim 23, wherein the first and second blister packs in the first and second pick positions are picked from above, and wherein the first and second blister packs in the first and second pick positions and in the place position are arranged with a same side facing up in each case.

25. The method of claim 23, wherein the place position is arranged in an area of the longitudinal center plane, and wherein the first and second blister packs, during a movement from the first and second pick positions to the place position, acquire lateral offsets in opposite directions transversely to the longitudinal center plane.

26. A method for transferring blister packs from a common pick position to a first and a second place position by means of a transfer unit, comprising the steps of:

providing a first blister pack in the pick position;

picking the first blister pack in the pick position, moving the first blister pack, and placing the first blister pack in the first place position, wherein the first blister pack in the first place position is placed from above, wherein the first blister pack in the first place position is outwardly offset from a longitudinal center plane of the transfer unit, and wherein the first blister pack in the first place position is placed with a rotation of 180° around a center of the first blister pack in comparison to an orientation of the first blister pack in the pick position;

providing the second blister pack in the pick position; and picking the second blister pack in the pick position, moving the second blister pack, and placing the second blister pack in the second place position, wherein the second blister pack is placed from above in the second place position, wherein the second blister pack in the second place position is outwardly offset from the longitudinal center plane, wherein the second blister pack in the second place position is placed with a rotation of 180° around a center of the second blister pack in comparison to an orientation of the second blister pack in the pick position, and wherein the first and second blister packs in the first and second place positions are arranged next to each other in a row which is transverse to the longitudinal center plane.

27. The method of claim 26, wherein the first and second blister packs in the pick position are picked from above, and wherein the first and second blister packs in the pick position and in the first and second place positions are arranged with a same side facing up in each case.

28. The method of claim 26, wherein the pick position is arranged in an area of the longitudinal center plane, and wherein, during a movement from the pick position to the first and second place positions, the first and second blister packs acquire opposite lateral offsets transverse to the longitudinal center plane.

* * * * *